United States Patent
Wall et al.

(10) Patent No.: US 11,969,045 B2
(45) Date of Patent: Apr. 30, 2024

(54) HELMET MOUNT FOR NIGHT VISION DEVICE

(71) Applicant: DESIGNWORKS DEFENCE SYSTEMS PTY LTD, Queensland (AU)

(72) Inventors: Alexander Wall, Queensland (AU); Warren Schroder, Queensland (AU)

(73) Assignee: DESIGNWORKS DEFENCE SYSTEMS PTY LTD., Queensland (AU)

( * ) Notice: Subject to any disclaimer, the term of this patent is extended or adjusted under 35 U.S.C. 154(b) by 313 days.

(21) Appl. No.: 16/955,208

(22) PCT Filed: Dec. 21, 2018

(86) PCT No.: PCT/AU2018/051403
§ 371 (c)(1),
(2) Date: Jun. 18, 2020

(87) PCT Pub. No.: WO2019/119070
PCT Pub. Date: Jun. 27, 2019

(65) Prior Publication Data
US 2020/0337406 A1    Oct. 29, 2020

(30) Foreign Application Priority Data
Dec. 22, 2017    (AU) ................................ 2017905184

(51) Int. Cl.
*A42B 3/04*    (2006.01)
*G02B 7/00*    (2021.01)
*G02B 23/12*    (2006.01)

(52) U.S. Cl.
CPC .............. *A42B 3/042* (2013.01); *G02B 7/002* (2013.01); *G02B 23/125* (2013.01)

(58) Field of Classification Search
CPC ......... A42B 3/042; G02B 7/002; G02B 3/125
USPC ............................................................ 2/410
See application file for complete search history.

(56) References Cited

U.S. PATENT DOCUMENTS

| | | | |
|---|---|---|---|
| 6,472,776 B1 * | 10/2002 | Soto ..................... | G02B 23/125 307/400 |
| 2002/0120979 A1 * | 9/2002 | Prendergast ......... | G02B 23/125 2/6.6 |
| 2004/0244099 A1 | 12/2004 | Prendergast | |
| 2010/0299814 A1 * | 12/2010 | Celona ..................... | A42B 3/04 2/422 |
| 2011/0145981 A1 * | 6/2011 | Teetzel ................. | G02B 23/125 2/422 |

(Continued)

OTHER PUBLICATIONS

International Search Report dated Mar. 18, 2019 for corresponding International Application No. PCT/AU2018/051403.

*Primary Examiner* — William R Alexander
*Assistant Examiner* — Sharrief I Broome
(74) *Attorney, Agent, or Firm* — TAROLLI, SUNDHEIM, COVELL & TUMMINO L.L.P.

(57) ABSTRACT

The present invention relates to mounting assemblies for optical devices, including enhanced night vision goggles (ENVG), and more particularly to a multi-adjustable and multi-stowable mount for a single or dual enhanced night vision goggles (ENVG). The mounting assemblies can include a quick release system for detachment of the optical device from the mount.

21 Claims, 28 Drawing Sheets

(56) References Cited

U.S. PATENT DOCUMENTS

| | | | | |
|---|---|---|---|---|
| 2014/0237708 A1* | 8/2014 | DiCarlo | ................ | A42B 3/042 |
| | | | | 2/422 |
| 2014/0327962 A1* | 11/2014 | Teetzel | ................ | F41G 11/003 |
| | | | | 359/409 |
| 2015/0002930 A1* | 1/2015 | Teetzel | ............... | G02B 27/0149 |
| | | | | 359/409 |
| 2015/0264229 A1* | 9/2015 | Teetzel | ............ | H04N 5/225251 |
| | | | | 348/376 |

* cited by examiner

HELMET MOUNT FOR NIGHT VISION DEVICE

RELATED APPLICATIONS

The present application is a U.S. National Stage application under 35 USC 371 of PCT Application Serial No. PCT/AU2018/051403, filed on 21 Dec. 2018; which claims priority from AU Patent Application No. 2017905184, filed 22 Dec. 2017, the entirety of both of which are incorporated herein by reference.

TECHNICAL FIELD

The present invention relates to mounting assemblies for optical devices, including enhanced night vision goggles (ENVG), and more particularly to a multi-adjustable and multi-stowable mount for a single or dual ENVG. The mounting assemblies can include a quick release system for detachment of the optical device from the mount.

BACKGROUND ART

Night vision devices are commonly used by military personnel for conducting operations in low light and night conditions. These night vision devices typically include image intensifier tubes and associated optics that convert infrared and near infrared light into viewable images.

Assemblies for mounting night vision goggles to a helmet or other headpieces are well known in the art. The mounting assemblies allow a user's hands to remain free while viewing a scene through the night vision goggles. Prior art mounting assemblies typically include one or more of the following features: positional adjustment of the night vision goggles between an in-use and flip-up stowed position; tilt angle adjustment of the night vision goggles relative to the user's eyes; focal adjustment (eye relief adjustment) of the location of the night vision goggles relative to the user's eyes; and semi-automatic shutdown of the attached ENVG.

Preferred assemblies for mounting night vision goggles to a helmet provide for the goggles to be attached to the helmet in a manner that allows a user to view a scene through the goggles without having to hold the goggles. Some of the prior mounting assemblies are removably attached to a helmet so that when a night vision device is not needed, such as in well-lit surroundings, the mounting assembly may be detached from the helmet.

One such mounting assembly for removably attaching a night vision device to a helmet includes a locking plate which lockingly receives the mounting assembly and is releasable by actuation of a push-button release mechanism. When using a helmet with such a mounting assembly, however, a user is at risk of injury if an impact to the night vision device and/or the helmet occurs.

For example, if a user wearing a helmet with such a mounting assembly were running and inadvertently crashed or otherwise entangled the night vision device with an external object, such as a tree branch or a line, the user's head and/or neck would likely be impacted or torqued in reaction to the external force being applied to the night vision device.

Accordingly, a need exists for an improved mounting assembly for attaching a night vision device to a helmet, which includes a multi-directional breakaway connection to the helmet, such that when a relatively large external force is applied to the night vision device, the mounting assembly breaks away from the helmet rather than transmitting the external force to the head and/or neck of the user.

It can be conceived that an external force applied from above the user may differ from an external force applied from below; for example, a falling tree branch would have a much higher force than catching on a line but both are able to damage the ENVG and user. An example of a prior art mounting assembly for night vision devices can be seen in U.S. Pat. No. 6,457,179 to Prendergast. Prendergast discloses a breakaway latch assembly that allows an ENVG to be removed if a certain predetermined force is applied to the mount. This force is the same in any direction and the latch will only breakaway as a result of a force applied from below the ENVG. It would be desirable for the connection between the helmet mount and the ENVG to have differing predetermined disconnection thresholds, in multiple directions, to provide for breakaway of the connection under different forces dependent on the direction of the force.

Furthermore it would be desirable if this disconnection feature could be manually disengaged. In certain circumstances it may be preferred for the ENVG not to disconnect from the helmet such as during close combat.

Prior mounting assemblies typically include interocular adjustment of the location of the night vision goggles relative to the user's eyes. However, prior mounting assemblies require the user to manually adjust the ENVG each time when returning from the stowed position to the in-use position. It is desirable for the interocular adjustment to be automatically retained such that the ENVG is in the personal adjusted position automatically when returned to the in-use position. Such automation would require the user to only set the interocular location once for any ENVG, while still allowing the transfer of mounting units between soldiers in combat without the need for tools to re-adjust. This may be required should the need arise for a redistribution of key equipment to key personnel in the field, following an event such as failure, loss or damage.

Known mounting assemblies adjust the interocular position through use of a tensioned rotatable pivot arm. The interocular position is set by the user rotating the entire ENVG around the pivot. While these systems offer good large adjustability, small adjustment is often required to position the ENVG correctly relative to the user's eyes. It would be desirable to have the ability to adjust the interocular position with small finite adjustments so that the correct position can be found with ease.

A further example of a prior art mounting assembly for night vision devices can be seen in U.S. Pat. No. 5,914,816 to Crawford et al. Crawford discloses a flip-up helmet mount for night vision goggles that provides a semi-automatic shutdown feature.

Prior art devices having a semi-automatic shutdown feature can be limited in their operational aspects because, amongst other reasons, the user is required to manually activate and de-activate the shutdown feature by moving a magnet assembly into place. Such mechanisms are susceptible to jamming and breakage while being unable to be easily accessed for maintenance purposes. The delay caused between the operator positioning the ENVG to the stowed position, and the manual activation of the shutdown feature is obviously undesirable since the phosphor yellow/green light emitted from the night vision device would then be visible to possibly hostile personnel in front of the operator. The time required to redeploy the ENVG to the in-use position and then de-activate the shutdown feature would similarly cause a delay in the use of the ENVG. This is a considerable disadvantage when transitioning between well-lit and dark environments.

Known mounting assemblies also typically have a removable carriage that detaches from the main assembly. The ENVG is mounted to the removable carriage such that the ENVG can be removed from the helmet when not in use for extensive periods of time and stored more securely. The main assembly can remain attached to the helmet block for quick reattachment of the ENVG. The carriage assembly is usually slidably connected to the main assembly in a double dovetail interface, wherein a pair of parallel ridges in the carriage slidably engage a pair of recesses in the main assembly.

Night vision devices and helmet mounts are often manufactured by different manufacturers. So that the parts will fit together, they are manufactured to certain specifications but can have dimension variations of up to about 0.25 mm. The fit of a carriage assembly into the main assembly is difficult with such variances. The fit should not be too loose, as noise from jiggling contact between the assemblies (for instance, when the user is in motion) should be avoided, as excessive noise would draw unwanted attention to the operator of the ENVG. Moreover, jiggling of the attached ENVG in the mount makes it more difficult to see clearly through the goggles. Conversely, the fit of the goggles should not be so tight that it is difficult for the carriage assembly to be connected with the main assembly, or disconnected therefrom. A snug fit between assemblies is therefore desired with a minimum amount of force required to connect the carriage assembly and main assembly.

Prior mounting assemblies with a slidable dovetail interface between the carriage assembly and the main assembly are known to be difficult to align. This is due to several factors including the small tolerances required between the parts to minimise the movement when assembled. The parts are also hard to align and engage as the dovetail interface is positioned outside the users viewing angle and is done unsighted. It would therefore be desirable if the alignment between the carriage assembly and the main assembly was improved such that it could be aligned quickly and easily, unsighted, and using only one hand.

It will be clearly understood that, if a prior art publication is referred to herein, this reference does not constitute an admission that the publication forms part of the common general knowledge in the art in Australia or in any other country.

SUMMARY OF INVENTION

The present invention is directed to a helmet mounting assembly for optical devices, including enhanced night vision goggles, which may at least partially overcome at least one of the abovementioned disadvantages or provide the consumer with a useful or commercial choice. More particularly, the helmet mounting assembly according to the present invention is designed to allow for a multi-directional calibrated breakaway connection, automatic shut off of an attached ENVG when stowed, and automatic activation of an ENVG when returned to the in-use position.

With the foregoing in view, the present invention in one form, resides broadly in a flip-up helmet mount for an optical device comprising: (i) a helmet block adapted to secure the flip-up helmet mount to a helmet; (ii) a bracket member coupled to the helmet block; (iii) a carriage chassis coupled to the bracket member, wherein the carriage chassis is adapted to receive an optical device and comprises an automatic shutoff mechanism; and (iv) a hinged pivot assembly associated with the carriage chassis.

In a preferred embodiment, the helmet block is secured into a receiving socket on the bracket member. The calibrated multi-directional breakaway means coupling the bracket member to the helmet block can comprise any suitable means that enables the optical device to be readily detached from the helmet when the optical device and/or helmet mount is subjected to an excessive external force in any direction. The detachment ensures that the external force is not transmitted to the head and/or neck of a user.

In a preferred embodiment, the calibrated multi-directional breakaway means includes at least two adjustable clips on the helmet block that couple into corresponding sockets on the bracket member to form at least two adjustable clip assemblies. During use, the at least two adjustable clip assemblies move independently of each other. Preferably, each clip assembly comprises an independent spring behind each clip which allows the clip to move back towards the centre of the helmet block against the spring force. To couple the clips on the helmet block into corresponding sockets on the bracket member, the sockets each comprise an internal ridge for engagement of a clip within the socket. In this embodiment, when a clip is received into a socket on the bracket member, the spring behind the clip is biased to the original position thereby pushing the clip firmly into the socket. The clip will thus be under spring pressure when engaged in a socket.

As each clip assembly has an independent spring, the spring pressure on each spring can be adjusted (calibrated) independently. Further, each spring can be adjusted (calibrated) to withstand a particular external force dependent on the direction of the external force. Thus, the external force required to separate the helmet block from the bracket member can be different, dependent on the direction of the applied external force.

In a further embodiment, the bracket member can additionally comprise a slideable lever to engage a plurality of notches on the helmet block. Engagement of the notches prevents the clip assemblies from being separated, thus overriding the breakaway means between the helmet block and the bracket member. The slideable lever can be moved manually by the user to disengage from the notches on the helmet block, thereby re-enabling the breakaway means.

In a preferred embodiment, the carriage chassis is removably secured into a receiving socket on the bracket member, thereby providing for quick separation of the carriage chassis from the bracket member and thus rapid removal of the optical device from the helmet. In one embodiment, the carriage chassis includes a moveable dovetail clip assembly that couples into a corresponding receiving socket on the bracket member. Preferably, the moveable dovetail clip assembly comprises a fixed dovetail ledge and a slideable dovetail clip. Even more preferably, the moveable dovetail clip assembly moves independently from the carriage chassis and can be actuated by the user with a single hand. Preferably, the moveable dovetail clip assembly contains a spring behind the slideable dovetail clip allowing the moveable dovetail clip assembly to move back towards the centre of the carriage chassis against the spring force. When the moveable dovetail clip assembly is received into the socket on the bracket member, the spring is biased to the original position thereby pushing the slideable dovetail clip firmly into the corresponding socket on the bracket member. The dovetail clip assembly will therefore always be under spring pressure while in the receiving socket on the bracket member with the slideable dovetail clip and the fixed dovetail ledge spread at least some distance apart. As the dovetail clip assembly is under spring pressure there should be little or no movement.

Preferably, the optical device is selected from the group consisting of a night vision goggle (NVG), an enhanced night vision goggle (ENVG), an opto-electronic device, a sighting device, a targeting device, a thermal imaging device, an infrared imaging device, a short-wave infrared imaging device, and a helmet-mounted display screen. In particularly preferred embodiments, the optical device is an NVG or an ENVG.

In a further embodiment, the mount comprises an automatic shutdown assembly for automatically shutting down an NVG or ENVG when it is not in the in-use position.

Preferably, the automatic shutdown assembly comprises a magnet module that pivots externally allowing easy access for maintenance. Particularly preferably, the magnet module is hinged externally to move in response to movement between the in-use and stowed position. The position of the magnet module is such that it comes to rest on a magnetic switching area of an attached ENVG. The ENVG preferably further comprises a mode selection switch, wherein the modes that can be selected comprise 'on' or 'off', with 'on' corresponding to enabling automatic shutdown, and 'off' corresponding to disabling automatic shutdown. Thus, the magnet module operates to automatically shutdown the night vision device whenever it is not in the in-use position, and the appropriate switch selection ('on') is made on the ENVG. In a further preferred embodiment, the magnet module is pivotable away from an ENVG under the influence of gravity.

The external position of the magnet module combined with the ability to pivot away from the ENVG under gravity produces a reliable automatic shutdown assembly that can be easily maintained in the field.

The helmet mounting assembly of the present invention can further comprise a position adjustment assembly within the carriage chassis. Preferably, the position adjustment assembly enables the position of an ENVG to be adjusted relative to a user's eyes.

In a particularly preferred embodiment, the position adjustment assembly within the carriage chassis comprises a hinged pivot assembly for adjusting the interocular distance. The hinged pivot assembly enables an ENVG to be rotated out of line of sight of the user and into the stowed position when not required. Preferably, the hinged pivot assembly includes an adjustment bar that passes through the hinged pivot assembly. The adjustment bar protrudes beyond the hinged pivot assembly and is stopped against the carriage chassis when the ENVG is in the in-use position. The distance that the bar protrudes beyond the pivot assembly controls the rotation angle of the pivot assembly in relation to the carriage chassis and therefore the interocular distance of the attached ENVG.

In a preferred embodiment, the adjustment bar utilises a screw with a receiving thread in the pivot assembly. By rotating the adjustment bar, the protruding distance can be increased or decreased finitely. This adjustment can be done easily with one hand in a controlled manner. Adjusting the protruding distance sets the pivot assembly rotation position and thus the attached ENVG interocular distance. It can be conceived that alternative mechanisms such as a geared or ratchet pin could be used to adjust the protruding distance of the adjustment assembly.

In a particularly preferred embodiment, the adjustment bar retains its position in relation to the pivot assembly such that the protruding distance remains constant when rotated between the in-use and stowed position. The pivot assembly therefore returns to the exact same position after being rotated into the stowed position. When returning the ENVG from the stowed position to the in-use position, no interocular adjustment is required.

In a further embodiment, the hinged pivot assembly associated with the carriage chassis is an indexed pivot hinge assembly for securing the position of the carriage chassis in relation to the bracket member. The indexed pivot hinge assembly allows the carriage chassis to be secured in either the in-use or stowed positions such that it will not move under normal use in the field. However, the carriage chassis can be adjusted between the stowed and in-use positions by overcoming the securing feature of the indexed pivot hinge assembly. The force required to overcome the securing feature of the indexed pivot hinge assembly is predetermined such that it can be completed by a single-handed operation regardless of operator hand dominance. This is particularly important in a combat environment when a user is required to keep a master hand on their firearm at all times.

The indexed pivot hinge assembly can further comprise hard stops at both the in-use and stowed positions. The hard stops provide user feedback that the desired position (either in-use or stowed) has been achieved. Furthermore, the hard stops ensure the carriage chassis is held firmly in position with relation to the bracket member allowing the calibrated multi-directional breakaway mechanism to function. The hard stops also reduce over-travel of the carriage chassis in relation to the bracket member.

In a particularly preferred embodiment, the indexed pivot hinge assembly is sealed from the external environment. Sealing from the external environment ensures that dirt, dust, water and other external particulate matter does not enter the mechanism, thereby safeguarding the reliability and longevity of the indexed pivot hinge assembly. Advantageously, sealing from the external environment reduces maintenance and servicing of the indexed pivot hinge assembly.

Over the life of an ENVG mount, a small amount of wear can occur between surfaces of different parts which move against each other under tension. The issue of wear is particularly relevant to the carriage chassis, bracket member and indexed pivot hinge assembly due to movement of the ENVG mount between the in-use and stowed positions. Over time, and with increased wear, the tolerances between the surfaces increases resulting in loose mechanisms that can be noisy and not operate correctly. In a further embodiment, the indexed pivot hinge assembly includes a spring or tensioner arrangement that automatically adjusts to changes in tolerances between parts, thus ensuring the mechanism remains at its optimum setting. The spring or tensioner arrangement is pre-loaded such that after automatically adjusting to tolerance changes, the spring tension remains within a pre-determined acceptable range. This ensures the force to overcome the indexed pivot hinge assembly such that the carriage chassis can be moved between in-use and stowed positions remains constant over the life of the ENVG.

In an alternative embodiment, the indexed pivot hinge assembly includes a release push button which when actuated, releases the carriage chassis from a locked position, either in-use or stowed, and allows rotation between the in-use and stowed positions.

In a further alternative embodiment, the indexed pivot hinge assembly includes a cable or pull shaft which when actuated, releases the carriage chassis from a locked position, either in-use or stowed, and allows rotation between the in-use and stowed positions.

The indexed pivot hinge assembly can include a torsional spring which rotates the carriage chassis towards the stowed position when the release push button, or the cable or pull shaft, is actuated. Rotating the carriage chassis slightly from a locked in-use position allows the user to actuate the release push button or cable or pull shaft and continue moving the carriage chassis towards the stowed position with one hand. The user can thus complete the change of position of the carriage chassis from in-use to stowed, ambidextrously with a single hand while keeping their master hand free to remain on a weapon or other control. Alternative spring arrangements for providing force on the carriage chassis to bias it towards the stowed position include an elastomer or compression spring hinge.

In a further embodiment, the carriage chassis is removably secured into a receiving socket on the bracket member through a dovetail clip that includes a side mounted locking assembly. Positioning the locking assembly on the side of a dovetail clip reduces the height of the carriage chassis in the Z-axis (the Z-height). Reducing the Z-height places the ENVG closer to the user's head when the mounting assembly is in the stowed position and significantly reduces the perceived weight of the ENVG. Positioning the ENVG closer to the user's head also reduces the risk of the ENVG catching on overhanging obstacles and damaging either the user or the ENVG.

Preferably, the side mounted locking assembly includes a locking mechanism that provides positive feedback once the carriage chassis is fully engaged. In this embodiment, the side mounted locking assembly includes a carriage lock lever that must first be depressed in order to start to assemble the carriage chassis and engage the locking mechanism. Once the carriage chassis is located on the bracket member the lock lever will not return to the locked position unless the dovetail is correctly seated. This ensures the user cannot inadvertently half engage the carriage chassis. It also highlights to the user if the carriage chassis and attached ENVG are not engaged and locked securely to the bracket member.

It is particularly preferred for the dovetail clip to comprise a tapered cut-out on its sidewalls. The tapered cut-out acts to take up lateral slack or play between the dovetail clip and the receiving socket of the bracket member. Specifically, the tapered cut-out automatically self-tightens the carriage chassis to the bracket member and reduces unwanted vibrations and movement of the ENVG in relation to the user.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

The invention may take form in various components and arrangements of components, and in various steps and arrangement of steps. The drawings are only for purposes of illustrating preferred embodiments and are not to be construed as limiting the invention.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
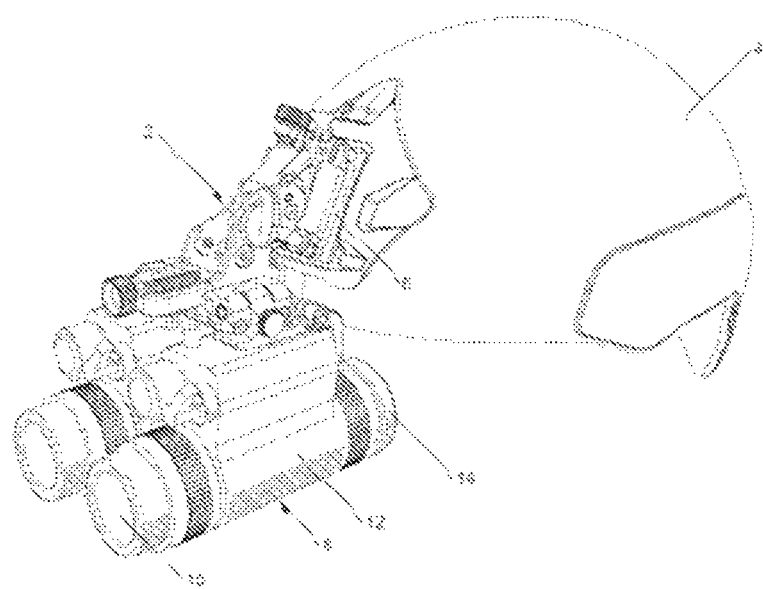
FIG. 1 is a perspective schematic view of a helmet with an associated ENVG device using a helmet mount system according to an embodiment of the invention wherein the ENVG is in the in-use position.
Figure 2:
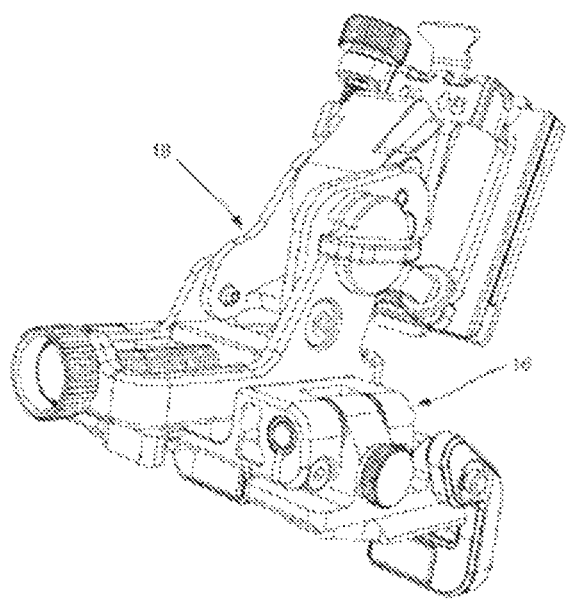
FIG. 2 is an enlarged view of the helmet mount system shown in FIG. 1 wherein the ENVG's are not shown and the system is in the in-use position.

Referring now to FIGS. 1, 2, 3 and 4, an embodiment of a flip-up helmet mount 2 according to the present invention is shown. The flip-up helmet mount 2 is shown in use with a standard composite helmet with a Visual Augmentation System (VAS) shroud 4. The flip-up helmet mount 2 is attached to the helmet 4 by a helmet block 6. A pair of enhanced night vision goggles (ENVG) 8 are secured to the helmet 4 by use of the flip-up helmet mount 2. Each ENVG 8 shown in FIG. 1 is a device that includes a single objective lens 10, a housing 12, and an eye piece 14. The ENVG 8 may be attached individually to the helmet mount 2 by a carriage chassis 16, which is mounted to a bracket member 18. To use the ENVG 8, the operator places it in the position depicted in FIG. 1 and looks into the eye pieces 14 to see an enhanced image representative of the low-level light from a night scene which has entered the objective lens 10.

Figure 4:
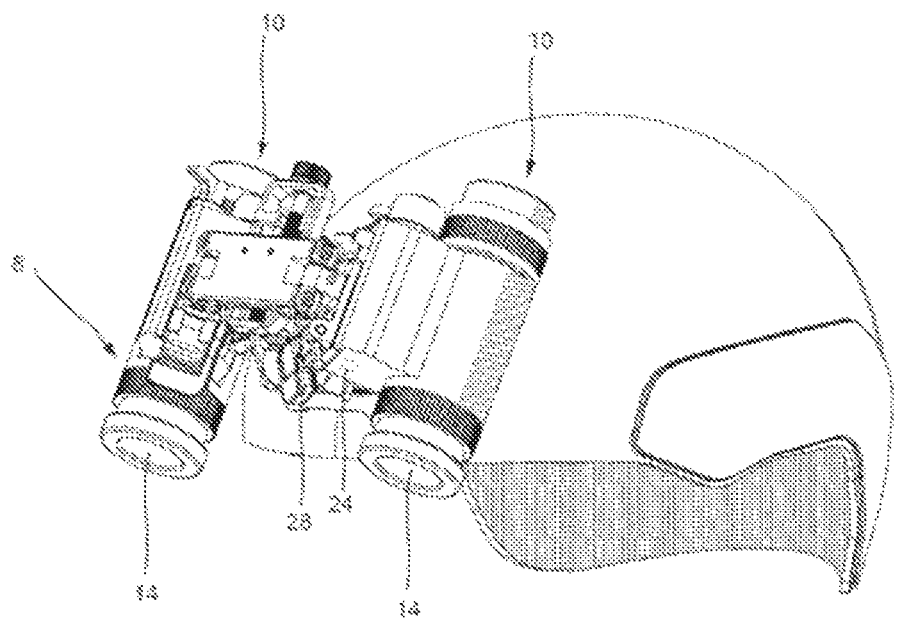
FIG. 4 is a perspective schematic view of a helmet mount system in the stowed position.

As shown in FIG. 1, the ENVG 8 is positioned to be in front of the operator's eyes so that the operator may look through the eye pieces 14 of the ENVG 8. This position is referred to as the "in-use" position. However, the flip-up helmet mount 2 also allows the operator to rotate the carriage chassis 16 around the carriage chassis pivot shaft 20, and bracket member 18 around the bracket member pivot shaft 22, allowing the operator to stow the ENVG 8 completely above the line of sight of the operator, to permit normal, unobstructed vision as depicted in FIG. 4. This position is referred to as the "stowed" position.

Automatic Shut Down Assembly

Additionally, the flip-up helmet mount 2 provides for automatic shutdown of the ENVG 8 when in the stowed position. More particularly, the flip-up helmet mount 2 provides for reliable, and essentially jam proof, automatic shutdown of the night vision device 8. Furthermore, the flip-up helmet mount 2 provides for maintenance and servicing of the automatic shutdown assembly in the field.

As is well known in the art, the night vision goggle 8 includes a power supply in the form of a battery pack (not shown) internal to the housing 12. A power supply circuit provides power to an image intensifier tube (not shown), which supplies an intensified image in phosphor yellow/green light of the scene viewed by the objective lens 10 to the eye pieces 14.

Figure 5:
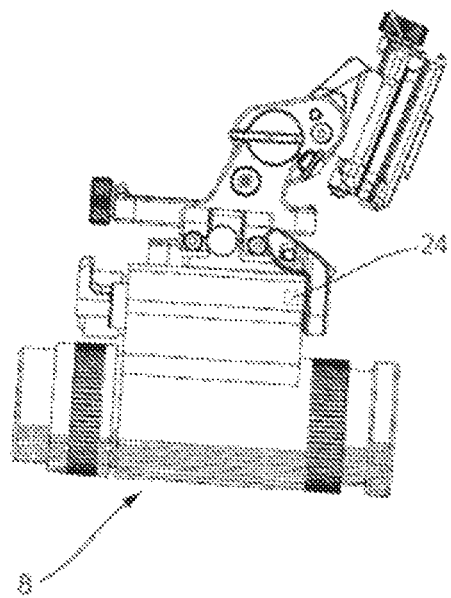
FIG. 5 is a schematic side view of a helmet mount system in the in-use position.
Figure 6:
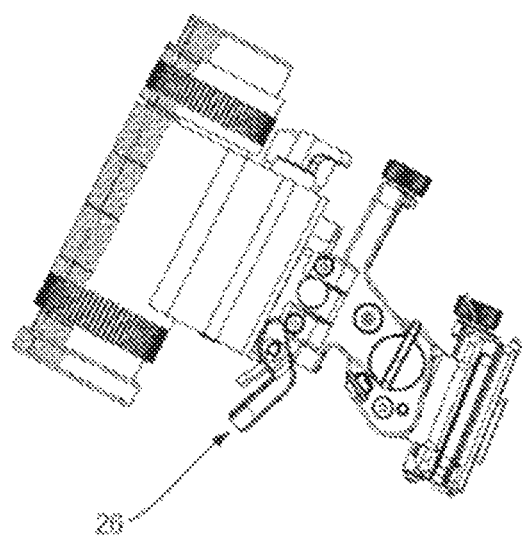
FIG. 6 is a schematic side view of a helmet mount system in the stowed position.
Figure 7:
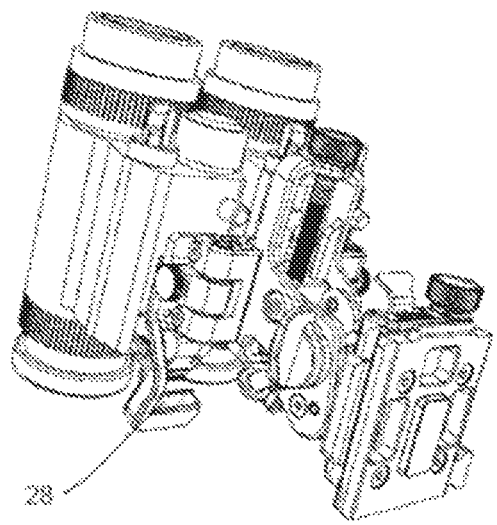
FIG. 7 is a perspective schematic view taken generally from the rear and side of a helmet mount system in the stowed position.
Figure 8:
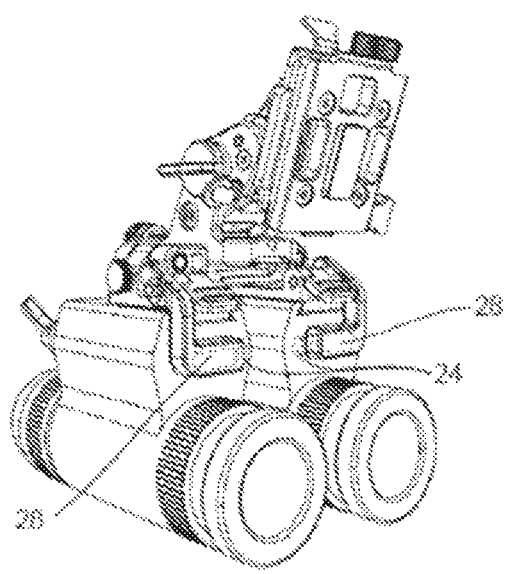
FIG. 8 is a perspective schematic view taken generally from the rear and side of a helmet mount system in the in-use position.

Referring now to FIGS. 4, 5, 6, 7, 8, 9 and 10, the power supply circuit also includes a magnetically-responsive switch 24 (FIG. 5). The magnetically-responsive switch 24 maintains electrical power supply to the ENVG 8 once it is turned on by the user only so long as a magnetic field of sufficient strength is supplied to the magnetically-responsive switch 24. An automatic shutdown assembly is essential when using a flip-up helmet mount 2, since, as best seen in FIG. 4, should the user forget to turn off the night vision goggle before moving it to the stowed position, the phosphor yellow/green light emitted from the eye pieces 14 would be visible to possibly hostile personnel in front of the user. The phosphor yellow/green light would appear as a pair of small spot lights and may be visible at great distances at night, indicating the position of the user of the night vision goggle to those in front of the user.

Figure 9:
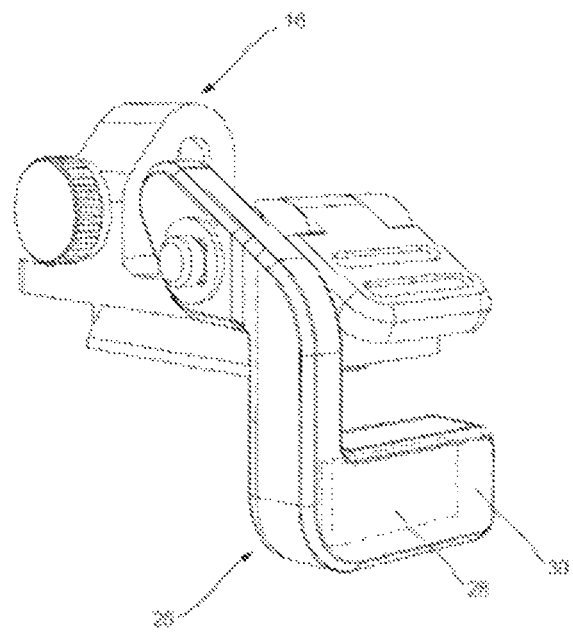
FIG. 9 is a perspective schematic view of an automatic shutdown assembly according to an embodiment of the invention.
Figure 10:
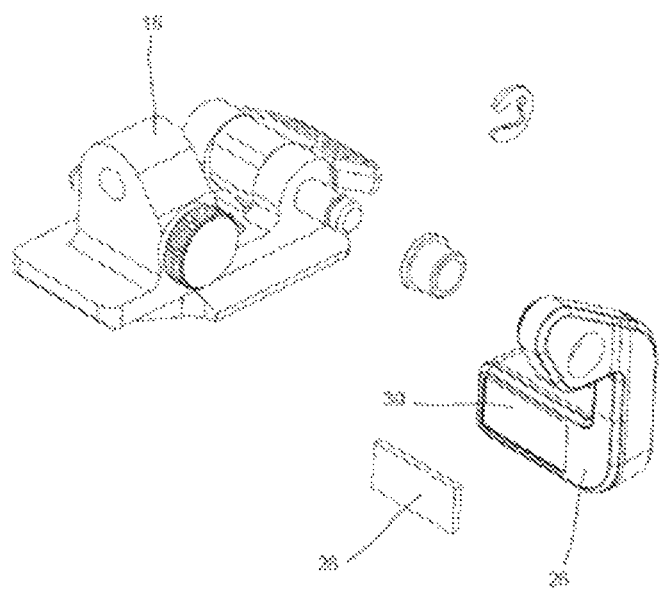
FIG. 10 is a schematic exploded perspective view of an automatic shutdown assembly according to an embodiment of the invention.

Accordingly, the flip-up helmet mount 2 includes an automatic shutdown assembly to provide the necessary magnetic flux to the magnetically-responsive switch 24 when the night vision device 8 is in the in-use position, while at the same time ensuring that the magnetic field is removed from the magnetically-responsive switch 24 when the night vision goggle 8 is pivoted to the stowed position. The automatic shutdown assembly includes a magnet module 26 hinged from the carriage chassis 16. The magnet module 26 is located at a rear section of the automatic shutdown assembly, immediately above the magnetically-responsive switch 24 of the night vision goggle 8. The magnet module 26 has a vertically extending block 30, as can be seen in FIG. 9. Positioned within the vertically extending block 30 is a bar magnet member 28. The bar magnet member 28 provides sufficient magnetic flux to the magnetically-responsive switch 24 to keep the ENVG 8 turned on so long as the bar magnet member 28 is in, or immediately adjacent to, the face of the magnetically-responsive switch 24. As can be seen from FIG. 8, the bar magnet member 28 is in this position when the night vision goggle 8 is in the in-use position. By way of contrast as can be seen from FIGS. 4 and 7, however, when the user flips-up the ENVG 8 into the stowed position, gravity acts on the magnet module 26 to pivot the magnet module 26 and encased bar magnet member 28 away from the magnetically-responsive switch 24 through the pivot axis. The bar magnet member 28 is sufficiently far enough from the magnetically-responsive switch 24 when it is in the stowed position that the ENVG 8 is automatically turned off.

One of the advantages of the automatic shutdown assembly provided for in the flip-up helmet mount 2 is that it is more reliable than the assemblies provided for in the prior art. This reliability of the shutdown assembly is due in part to the accessibility of the hinged magnet module 26. The operator can visually and physically inspect that the magnet module 26 is moving freely in relation to the carriage chassis 16 in the field.

When using the flip-up helmet mount 2, the operator first secures the helmet block assembly 6 to the helmet 4 and then secures the carriage chassis 16 to the bracket member 18. Once the flip-up mount 2 is secured to the helmet 4, the ENVG 8 may be secured to the carriage chassis 16 and adjusted into its in-use position, as seen in FIG. 1. When positioned in this manner, the magnet module 26 is positioned to maintain the ENVG 8 turned on once the operator switches it on. In this position, the operator is able to adjust the tilt and focus of the goggle 8 using a single hand, allowing the operator to optimize the viewing conditions of the goggle 8 without occupying both the user's hands during the adjustment process. When the operator flips the goggle 8 up to its stowed position, the goggle 8 is automatically turned off, as explained above.

Dual Force Breakaway

Additionally, the flip-up helmet mount 2 includes a breakaway connection to the helmet 4, such that when a relatively large external force is applied to the ENVG 8, the mounting assembly breaks away from the helmet 4 rather than transmitting the external force to the head and/or neck of the user.

Figure 3:
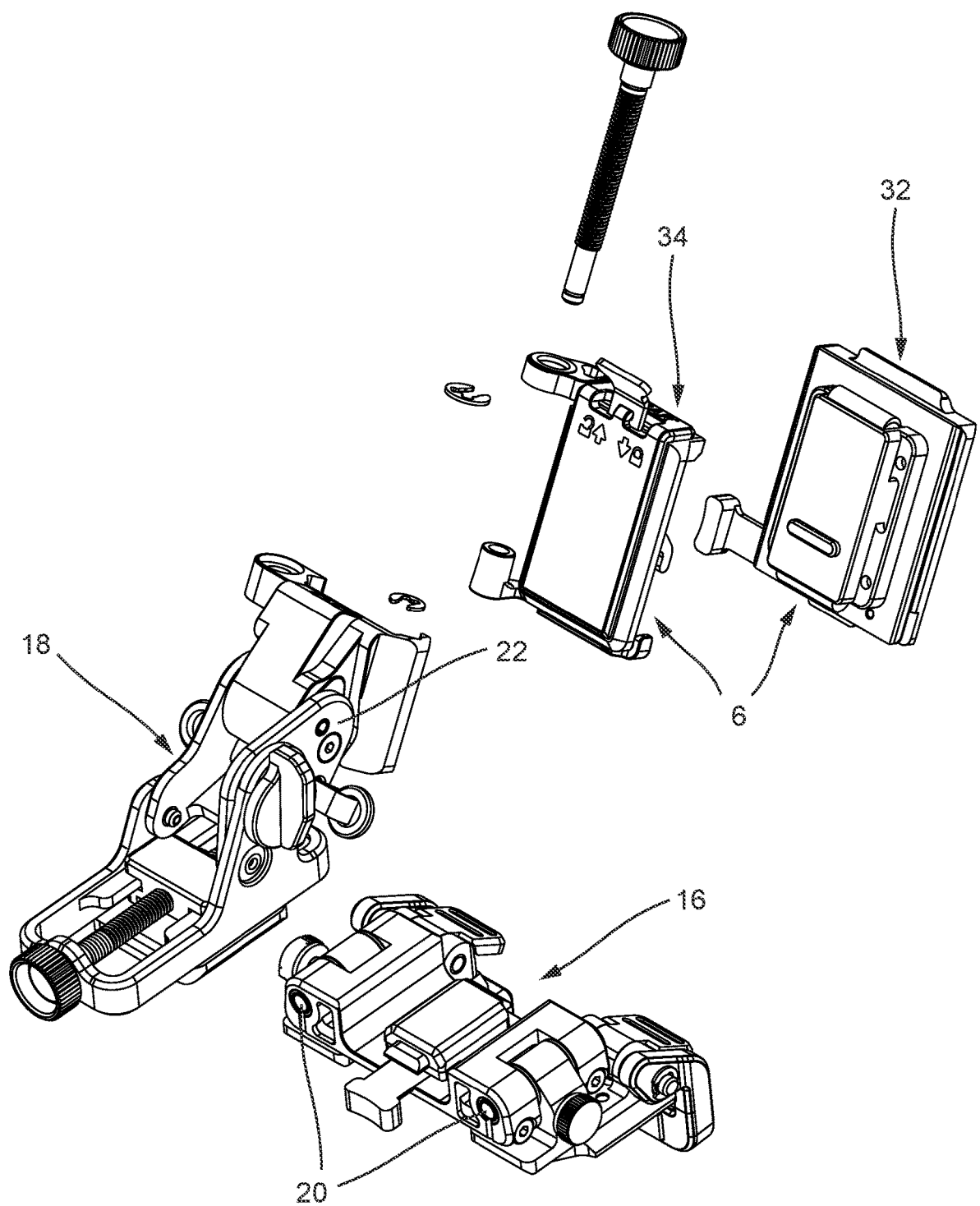
FIG. 3 is an exploded perspective view of the helmet mount system shown in FIG. 2 wherein the ENVG's are not shown and the system is in the in-use position.
Figure 11:
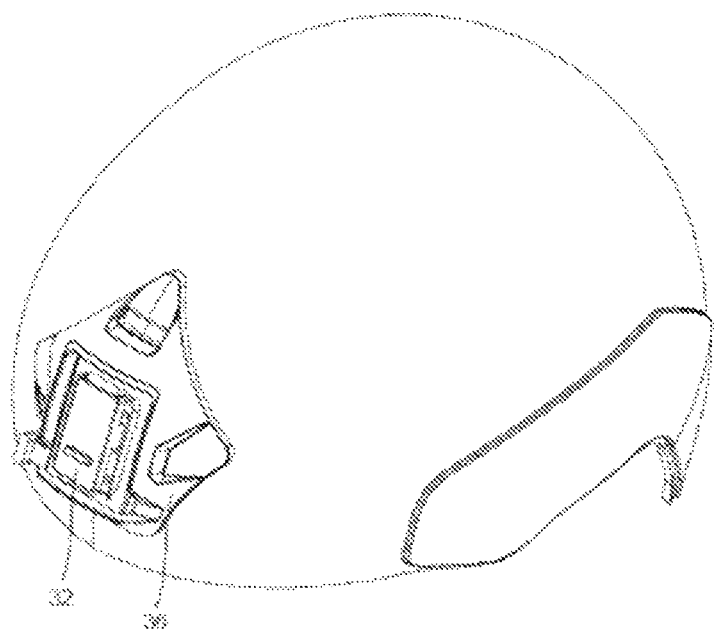
FIG. 11 is a perspective schematic view of a helmet and an attached helmet block.
Figure 12:
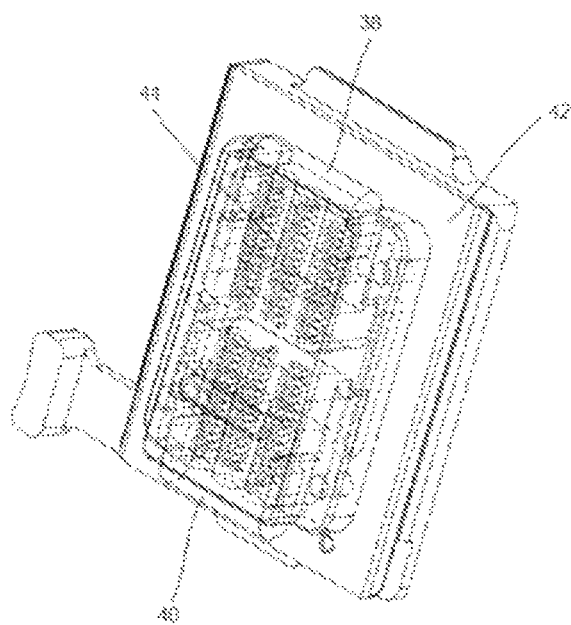
FIG. 12 is a perspective schematic view of a helmet block according to an embodiment of the invention.
Figures 13, 14:
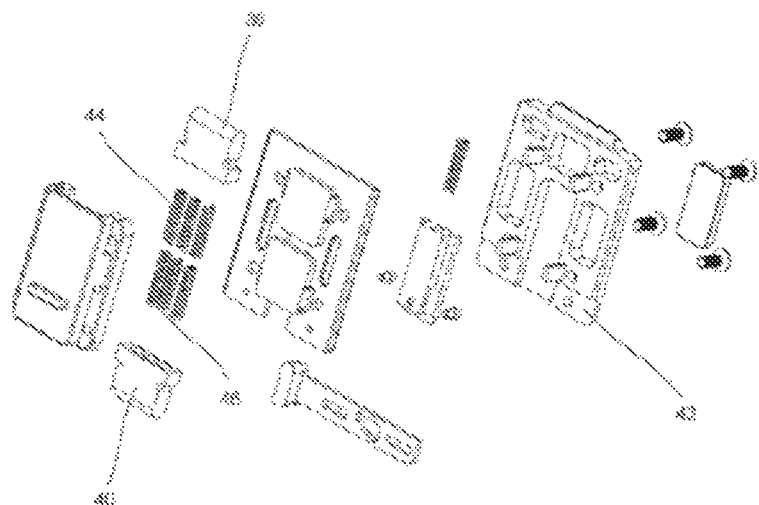
FIG. 13 is a schematic exploded perspective view of the helmet block shown in FIG. 12.
FIG. 14 is a schematic exploded perspective view of a helmet block and bracket member according to one embodiment of the invention.
Figure 15:
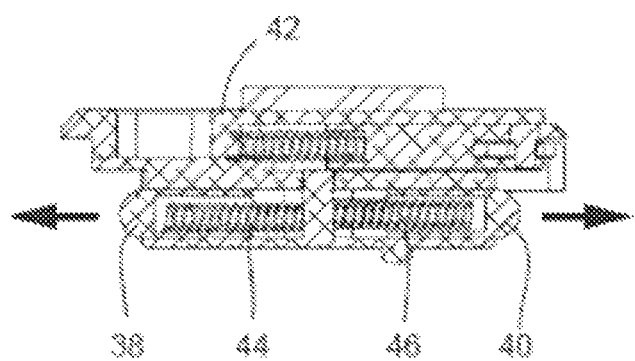
FIG. 15 is a schematic sectional side view of a helmet block according to one embodiment of the invention, cut along its central axis.
Figure 16:
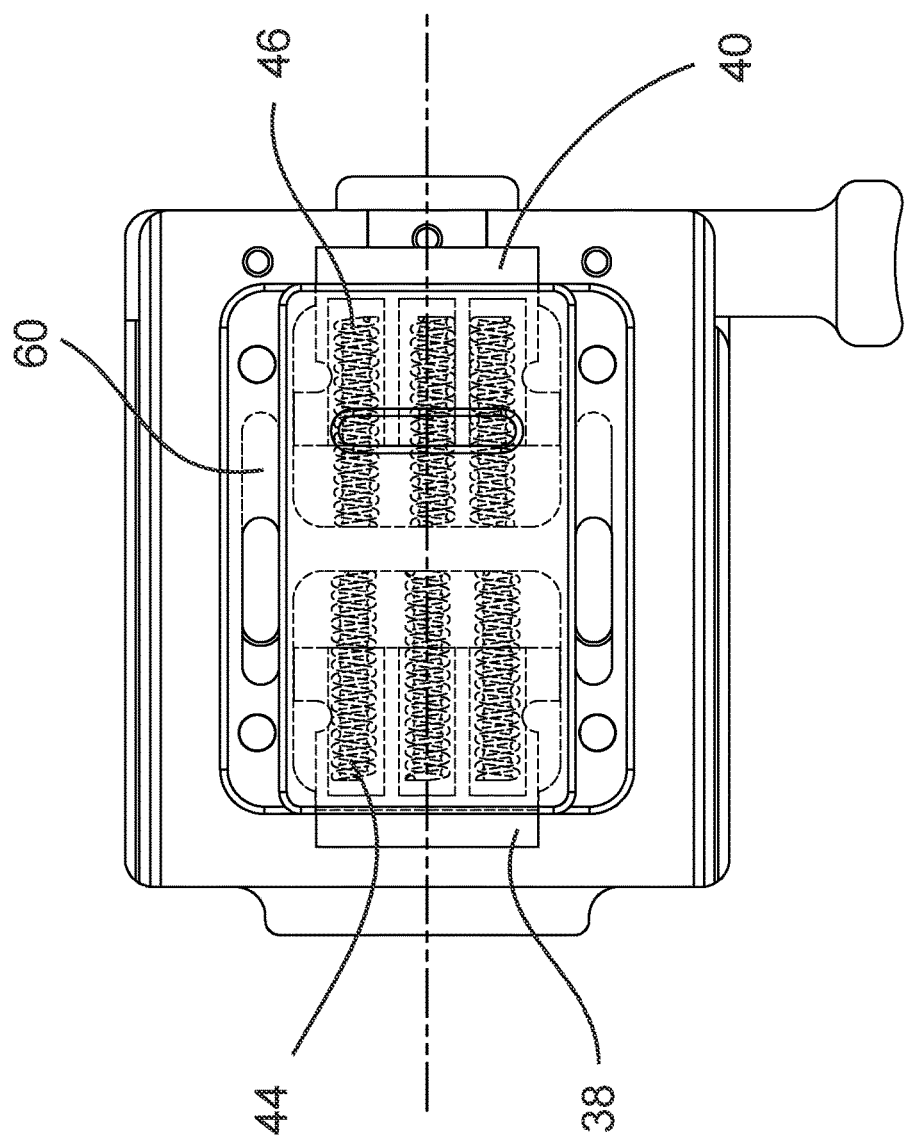
FIG. 16 is a schematic front view of a helmet block.
Figure 17:
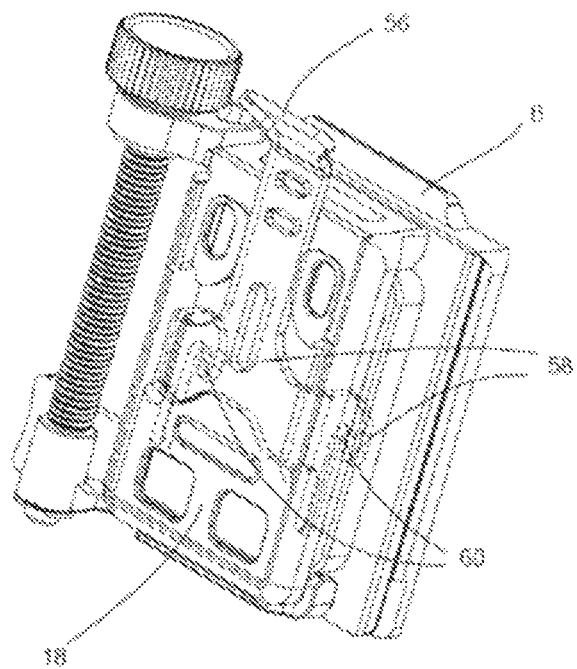
FIG. 17 is a perspective schematic view of a helmet block with a bracket member according to one embodiment of the invention.
Figure 18:
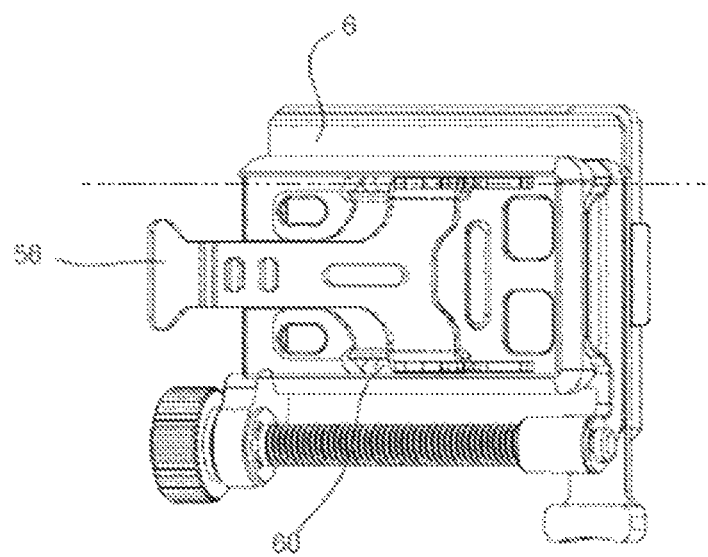
FIG. 18 is a schematic front view of a helmet block with a bracket member.
Figure 19:
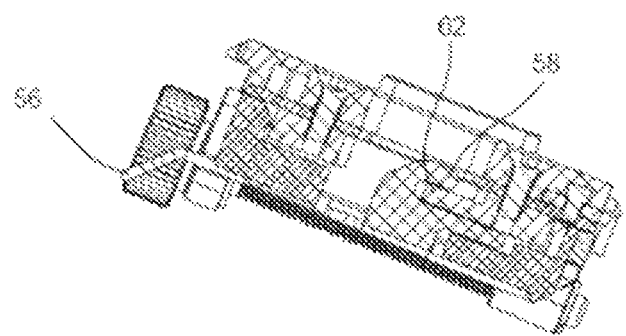
FIG. 19 is a schematic sectional side view of a bracket member.
Figure 20:
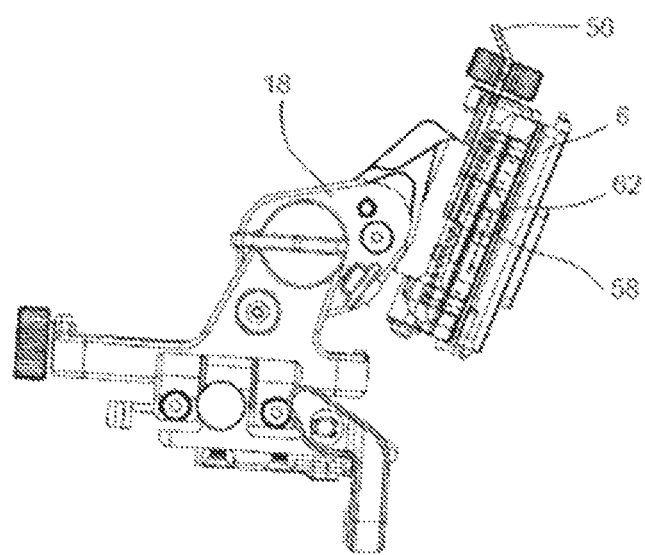
FIG. 20 is a schematic side view of a helmet block, bracket member and carriage chassis.
Figure 21:
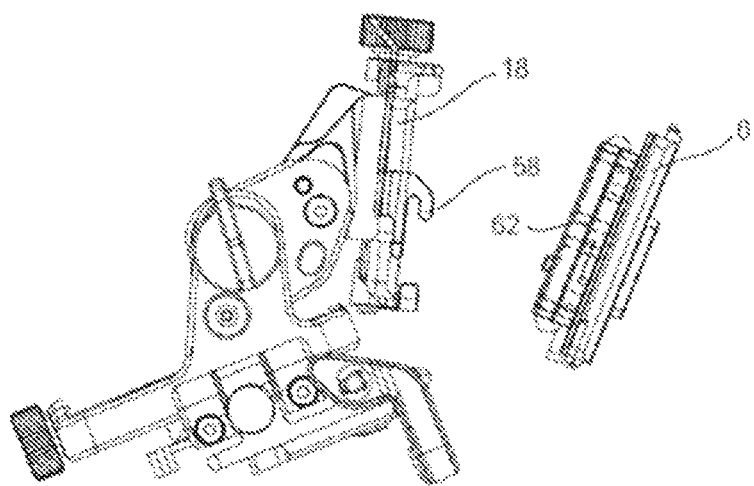
FIG. 21 is a schematic exploded side view of a helmet block, bracket member and carriage chassis, with the helmet block separated from the bracket member.
Figure 22:
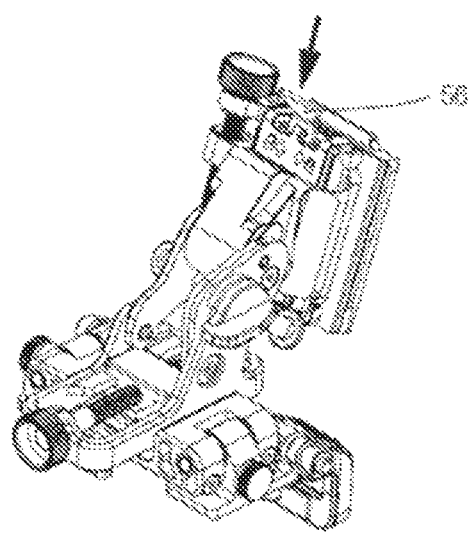
FIG. 22 is a perspective schematic view of a helmet block, bracket member and carriage chassis with a slideable breakaway lever in the locked position.
Figure 23:
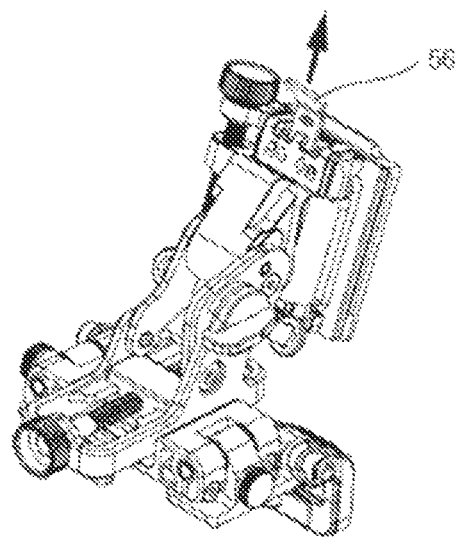
FIG. 23 is a perspective schematic view of a helmet block, bracket member and carriage chassis with a slideable breakaway lever in the unlocked position.
Figure 24:
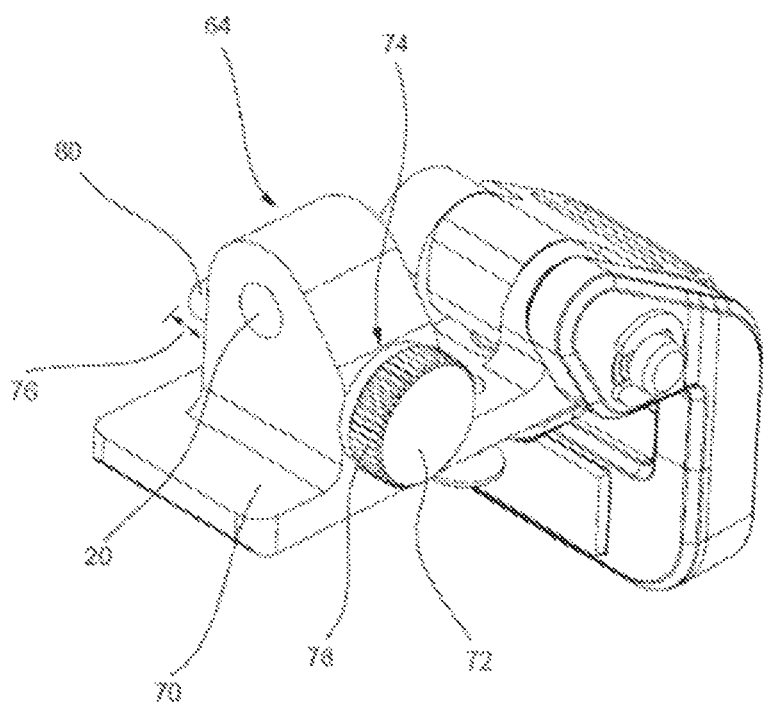
FIG. 24 is a perspective schematic view of a hinged pivot assembly.
Figure 25:
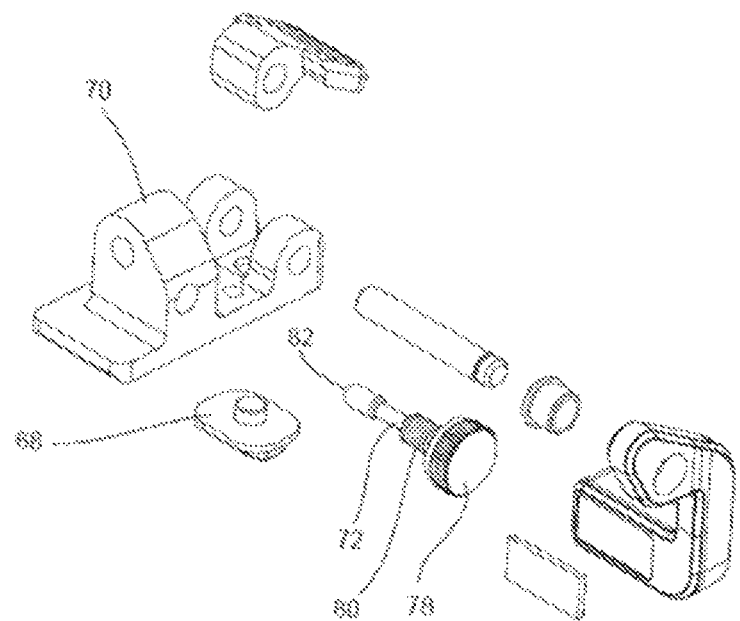
FIG. 25 is a schematic exploded perspective view of a hinged pivot assembly.
Figure 26:
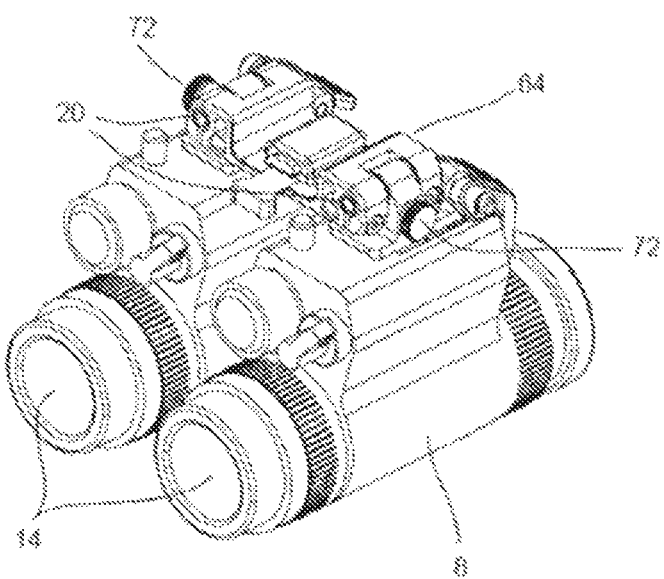
FIG. 26 is a perspective schematic view of a carriage chassis with attached ENVG in the in-use position.
Figure 27:
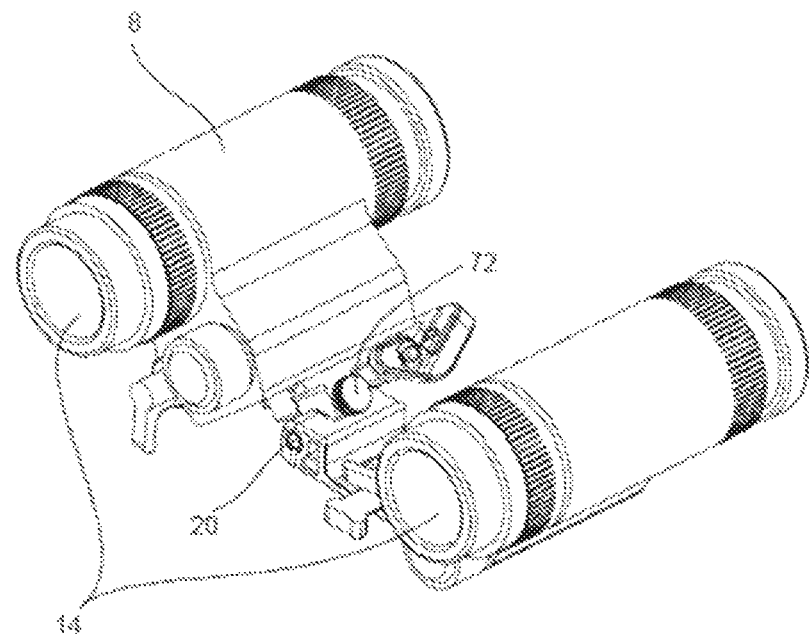
FIG. 27 is a perspective schematic view of a carriage chassis with attached ENVG in the stowed position.

FIG. 3 shows a helmet block assembly 6 comprising a helmet block connector 32 and a breakaway connector 34 for attaching an ENVG 8 to a helmet 4 according to one embodiment of the present invention. The helmet block connector 32 may be integrally attached to, removably attached to, or fixedly attached to a helmet mounting surface 36, as seen in FIG. 11. Alternatively, the helmet block connector 32 can be integrally formed with the helmet mounting surface 36. As used herein, the phrase 'a breakaway connection' is used to refer to a removable connection which may be disengaged upon the exertion of at least a predetermined amount of force without requiring the actuation of a release mechanism.

The ENVG 8 may be removable or fixedly attached to the carriage chassis 16. As described in detail below, bracket member 18 is removably attached to the helmet 4 by use of the helmet block connector 32. Preferably, the bracket member 18 includes mechanisms allowing for vertical adjustments, tilt adjustments, rotational adjustments and focal adjustments of the ENVG 8 relative to the helmet 4.

In one embodiment as shown in FIG. 3, the helmet block assembly 6 is coupled to the bracket member 18 by a breakaway connector 34. Referring now to FIGS. 11, 12, 13, 14, 15 and 16, the breakaway connector 34 includes an upper clip block 38 and lower clip block 40 which slide vertically with respect to an interface plate 42. The upper clip block 38 and lower clip block 40 are supported by upper springs 44 and lower springs 46 respectively. The upper clip block 38 and lower clip block 40 are spring-biased to extend outwards from the centre of the helmet block assembly 6 and into the opening of the bracket member receiving plate 48, and are movably received within a channel 50 in the bracket member receiving plate 48 upon a force which exceeds the spring-bias. To insert the upper clip block 38 and lower clip block 40, the leading edge of one of the clip blocks is inserted into the corresponding upper indentation 52 or lower indentation 54 of the receiving plate 48, and the opposite end of the helmet block is rotated towards and pressed against the breakaway connector 34 until the clip block is inserted into the indentation in the receiving plate 48. Once the clip block 38 or 40 has moved past the receiving plate 48, the spring-bias of the clip block 38 or 40 allows the clip lock 38 or 40 to snap back into its original position to capture the breakaway connector 34 within the opening channel 50 of the bracket member receiving plate 48.

The upper clip block 38 is spring-biased by the upper springs 44. These are independent from the lower springs 46 such that the spring tension for the upper clip block 38 and lower clip block 40 can be different. As such, the exertion required to disengage the upper clip block 38 and the lower clip block 40 can be individually set.

In the embodiment shown in FIGS. 17, 18, 19, 20 and 21, the breakaway connector 34 can be disengaged by depressing the breakaway lever 56 and removing the ability for the helmet block assembly 6 to separate from the bracket member 18 beyond the predetermined breakaway force. The breakaway lever 56 is a slideable plate captured by the bracket member 18 that includes two perpendicular lockout hooks 58 that extend beyond the bracket member 18. The lockout hooks 58 are received in corresponding lockout grooves 60 in the helmet block assembly 6. When the breakaway lever 56 is depressed, the lockout hooks 58 slide over a lockout ledge 62 in the lockout groove 60 holding the bracket member 18 and helmet block assembly 6 together. When the breakaway lever 56 is pushed outwards from the centre of the helmet block 6, the lockout hooks 58 are free from the lockout ledge 62 in the helmet block 6 such that the bracket member 18 can be removed from the helmet block 6 once enough force is placed on the mount that exceeds the upper spring 44 and lower spring 46 force as described above. Preferably the length of the lockout hook 58 is such that the interfacing surfaces between the lockout hook 58 and the lockout ledge 62 provide sufficient interference.

Tool-Less Interocular Adjustment Memory Lock

Figure 28A:
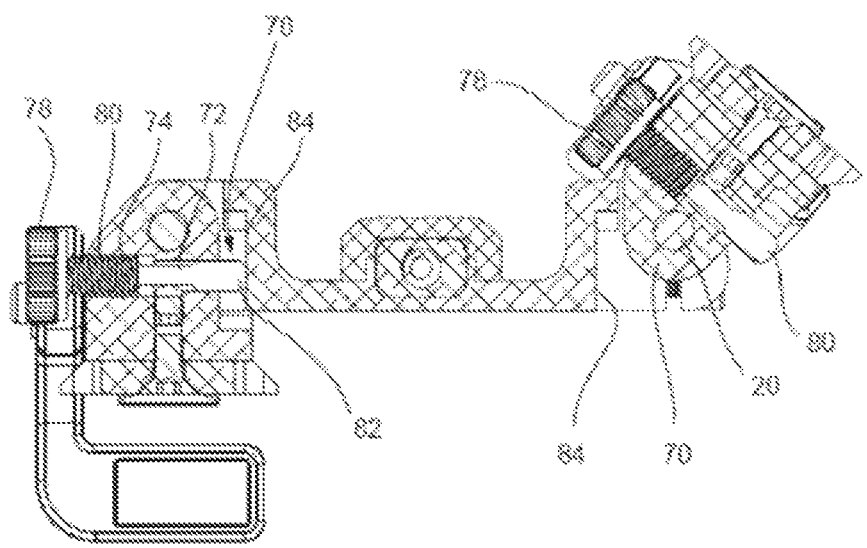
FIG. 28A is a schematic sectional side view of a carriage chassis cut along its central axis.

The flip-up helmet assembly 6 also allows for interocular adjustment of the location of the ENVG 8 relative to the user's eyes. As shown in FIGS. 24, 25, 26 and 27, the carriage chassis 16 includes a hinged pivot assembly 64 that rotates centrally around the carriage chassis pivot shaft 20. The ENVG 8 is attached to an attachment shoe 68 that is part of the hinged pivot assembly 64. An operator is able to attach the ENVG 8 to the attachment shoe 68 and rotate the hinged pivot assembly 64 to stow the ENVG 8 completely above the line of sight of the operator, to permit normal, unobstructed vision. As best shown in FIG. 28A, the hinged pivot assembly 64 comprises a hinge block 70 and an adjustment bar screw 72. The adjustment bar screw 72 extends through a threaded opening 74 in the hinge block 70 and extends beyond the hinge block 70 by a protruding distance 76. The adjustment bar screw 72 includes a larger tactile cylinder 78, central to the adjustment bar screw axis at the outmost part of the adjustment bar screw 72. The larger tactile cylinder 78 is large enough such that it can be gripped by the operator's fingers and rotated without the use of any tools. Rotating the adjustment bar screw 72 engages the adjustment bar screw thread 80 with the threaded opening 74 in the hinge block 70 and moves the adjustment bar screw 72 towards and away from the carriage assembly central axis. The innermost end of the adjustment bar screw 82 rests against the memory lock block face 84 in the carriage chassis 16 when the hinge block 70 is rotated to the in-use position. By rotating the adjustment bar screw 72 to increase the protruding distance 76 of the innermost end of the adjustment bar screw 82, the hinge block 70 is rotated away from the central axis when the innermost end of the adjustment bar screw 82 rests against the memory lock block face 84. This increases the distance between the eyepieces 14 of the attached ENVG 8 and thus increases the interocular distance.

The adjustment bar screw 72 retains its position within the threaded opening 74 in the hinge block 70 until the larger tactile cylinder 78 is rotated. Thus, the protruding distance 76 remains unchanged when the operator rotates the hinge block 70 and attached ENVG 8 into the stowed position. When the operator rotates the hinge block 70 and attached ENVG 8 back into the in-use position, the innermost end of the adjustment bar screw 82 rests against the memory lock block face 84 in exactly the same position as was previously set.

Figure 28B:
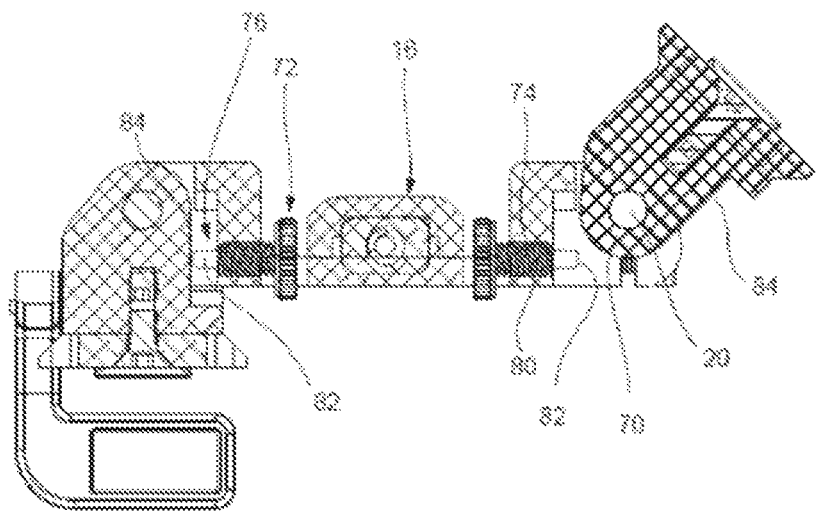
FIG. 28B is a schematic sectional side view of a carriage chassis cut along its central axis.

In an alternative embodiment as shown in FIG. 28B, the adjustment bar screw 72 extends through a threaded opening in the carriage chassis 16 extending towards the hinge block by a protruding distance 76. Rotating the adjustment bar screw 72 engages the adjustment bar screw thread 80 with the threaded opening 74 in the carriage chassis 16 and moves the adjustment bar screw 72 towards and away from the carriage chassis 16 central axis. The outermost end of the adjustment bar screw 82 rests against the memory lock block face 84 in the hinge block 70 when it is rotated to the in-use position.

Carriage Clip

Figure 29:
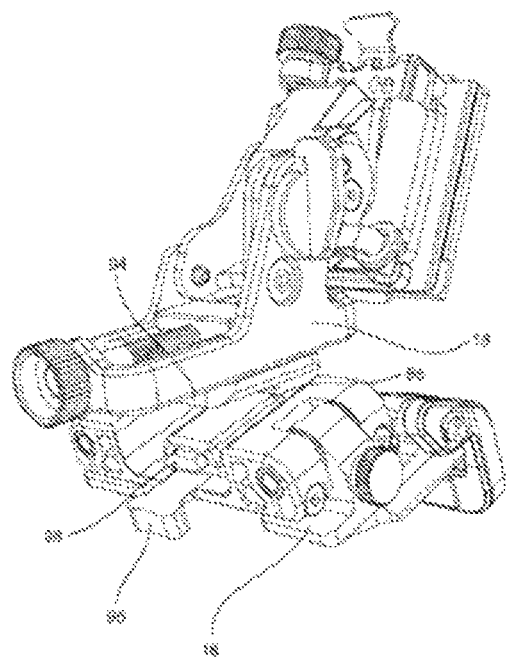
FIG. 29 is a perspective schematic view of a bracket member and carriage chassis.
Figure 30:
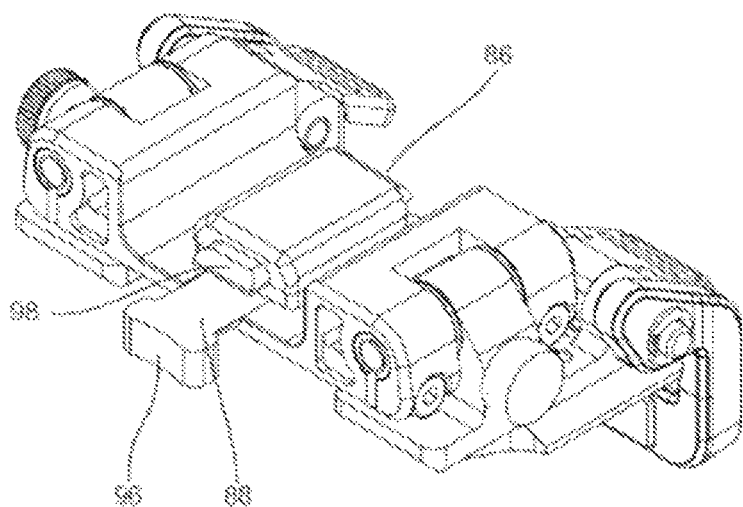
FIG. 30 is a perspective schematic view of a carriage chassis.
Figure 31:
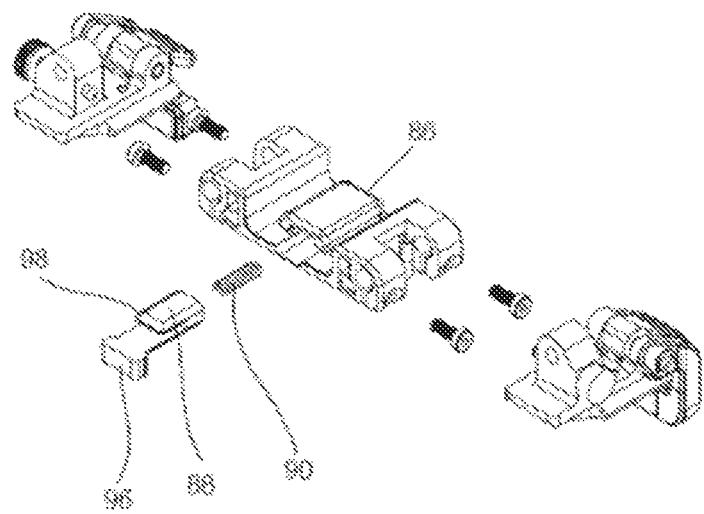
FIG. 31 is a schematic exploded perspective view of a carriage chassis.
Figure 32:
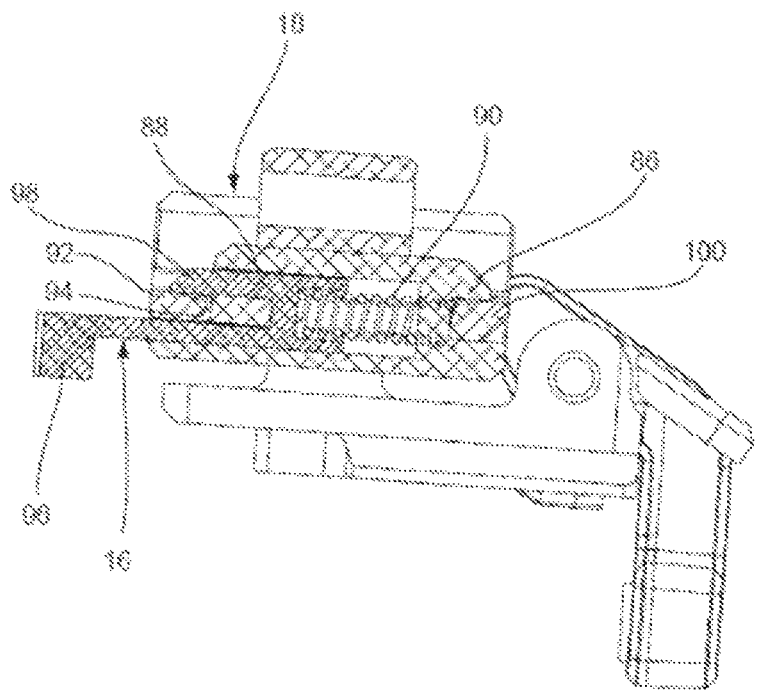
FIG. 32 is a schematic sectional side view of a carriage chassis cut along its central axis.

In the embodiment as shown in FIG. 29, the carriage chassis 16, is removable from the bracket member 18 for storage purposes. As shown in FIGS. 29, 30 and 31, the carriage chassis 16 includes a fixed dovetail ledge 86 at the end closest to the user's face. The carriage chassis 16 includes a slidable dovetail clip 88 which slides horizontally with respect to the carriage chassis 16. The slidable dovetail clip 88 is supported by a compression spring 90. The slidable dovetail clip 88 is spring-biased to extend outwards from the fixed dovetail ledge 86 end of the carriage chassis 16 and into the opening of the bracket member receiving plate 92, and is movably received within a channel of a receiving dovetail ledge 94 in the carriage chassis. The slidable dovetail clip 88 includes a block that extends from the centre of the carriage chassis 16 creating a slidable dovetail lever 96 that can be depressed by the operator to compress the compression spring 90 and slide the slidable dovetail clip 88 back towards the centre of the carriage chassis 16. The slidable dovetail clip 88 also includes a slidable dovetail ledge 98 that extends beyond the receiving dovetail ledge 94 in the bracket member receiving plate 92 in the carriage chassis 16.

To insert the carriage chassis 16 into the bracket member 18, the fixed dovetail ledge 86 is inserted into the indentation 100 of the bracket member receiving plate 92. With the slidable dovetail lever 96 depressed, the opposite end of the carriage chassis 16 is rotated upwards and pressed against the bracket member 18. The spring-bias of the slidable dovetail clip 88 allows the slidable dovetail clip 88 to slide back into its original location, positioning the slidable dovetail ledge 98 above the receiving dovetail ledge 94 within the bracket member receiving plate 92. With the slidable dovetail ledge 98 above the receiving dovetail ledge 94 the parts are secured together and cannot be separated without the slidable dovetail lever 96 being depressed and the slidable dovetail ledge 98 being rotated out of the bracket member receiving plate 92. The spring-bias of the slidable dovetail clip 88 ensures a tight fit between the slidable dovetail clip 88 and the bracket member receiving plate 92 as well as the fixed dovetail ledge 86 and the indentation 100 of the bracket member receiving plate 92. With a tight fit between the carriage chassis 16 and the bracket member 18, the attached ENVG 8 is held still and noise and vibration are significantly reduced if not eradicated.

Indexed Pivot Hinge

Figure 33:
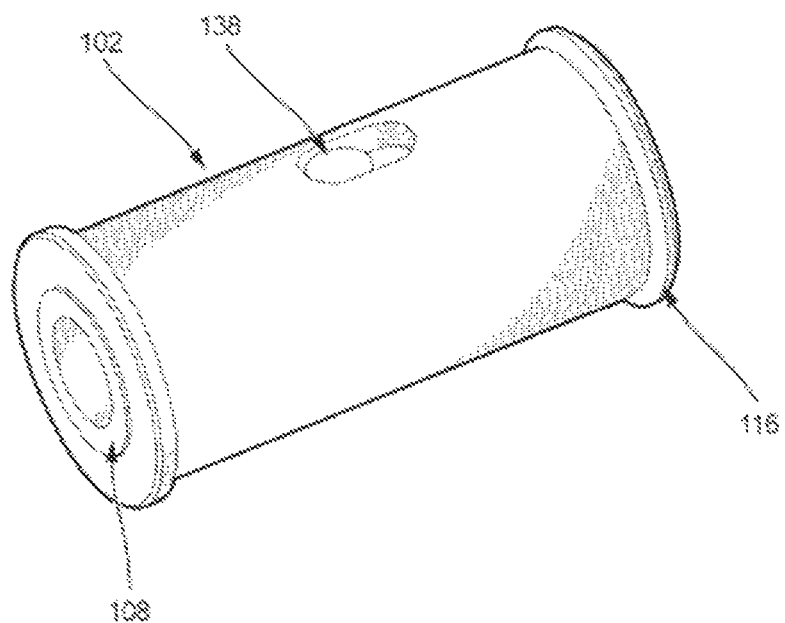
FIG. 33 is a perspective schematic view of an indexed pivot hinge assembly according to one embodiment of the invention.
Figure 34:
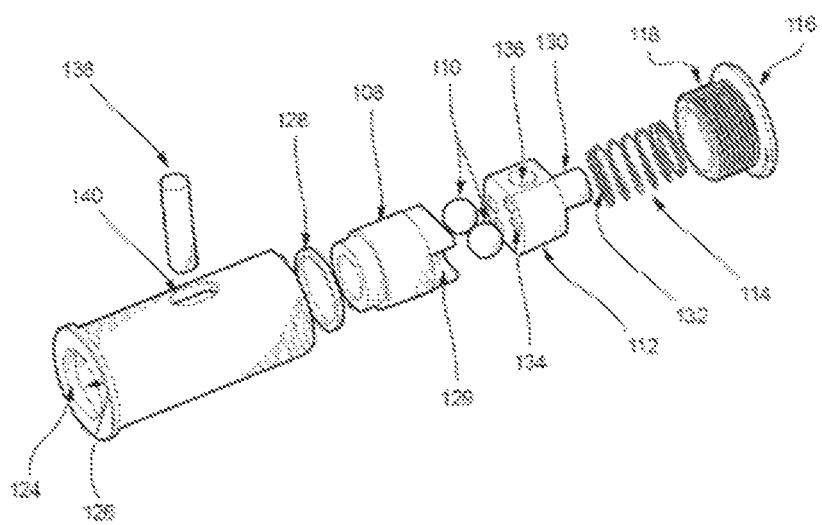
FIG. 34 is a schematic exploded perspective view of an indexed pivot hinge assembly according to one embodiment of the invention.
Figure 35:
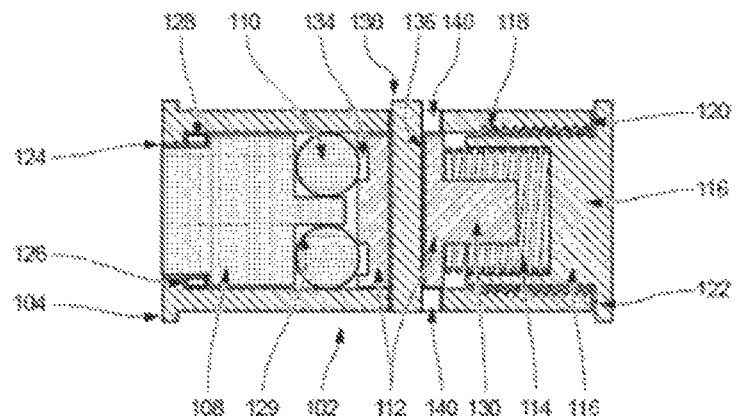
FIG. 35 is a schematic sectional side view of an indexed pivot hinge assembly according to one embodiment of the invention cut along its central axis.

Referring now to FIGS. 33, 34 and 35, there is shown an embodiment of an indexed pivot hinge assembly 102. In use, the indexed pivot hinge assembly 102 connects the carriage chassis 16 to a bracket member 18 (as shown, for example, in FIG. 2), allowing the ENVG 8 to be moved between in-use and stowed positions. The indexed pivot hinge assembly 102 includes an outer casing 104 that is received in a carriage chassis hinge locator recess 106. The outer casing 104 encases a bearing keyway 108, ball bearings 110, pressure plate 112 and a spring or tensioner 114.

The outer casing 104 is capped at one end with a casing cap 116 which is retained by a casing cap thread 118 to secure all internal components. When the casing cap 116 is tightened it forms a seal between the casing cap sealing face 120 and the outer casing sealing face 122. The bearing keyway 108 protrudes through a casing hole 124 in the outer casing 104. The outer case 104 includes an internal sealing face 126 which seals against a bushing 128 trapped between the bearing keyway 108 and the outer casing 104. The sealing at both the casing hole 124 and casing cap 116 ends of the indexed pivot hinge assembly 102 prevents dirt, dust, water and external particulate matter from entering the indexed pivot hinge assembly 102.

The bearing keyway 108 includes a number of bearing recesses 129, which accept a number of ball bearings 110. A pressure plate 112 is pushed against the ball bearings 110 through a spring or tensioner 114 which is pre-loaded against the casing cap 116. In a preferred embodiment, the pressure plate 112 includes a pressure plate central boss 130 which fits inside a the spring or tensioner receiving hole 132 to ensure the spring or tensioner 114 remains central and pushes evenly against the pressure plate 112.

The pressure plate 112 includes several pressure plate ball bearing receiving holes 134 to locate the ball bearings 110. The pressure plate 112 is pushed under force from the spring or tensioner 114 against the ball bearings 110 with the shape of the pressure plate ball bearing receiving holes 134 ensuring the ball bearings 110 cannot easily move. The pressure plate 112 includes several sets of pressure plate ball bearing receiving holes 134 that align with the ball bearings 110 and are located to position the carriage chassis 16 in either the in-use or stowed positions relative to the bracket member 18.

In use, rotation of the carriage chassis 16 with a force greater than a predetermined force, results in rotation of the ball bearings 110 against the pressure plate ball bearing receiving holes 134 such that they push the pressure plate 112 away against the spring or tensioner 114 and are no longer retained in the pressure plate ball bearing receiving holes 134. Once the ball bearings 110 are out of the pressure plate ball bearing receiving holes 134, the indexed pivot hinge assembly 102 is free to rotate until the ball bearings 110 locate again in the pressure plate ball bearing receiving holes 134, which correspond with the either the stowed or in-use positions. As the ball bearings 110 locate into the pressure plate ball bearing receiving holes 134, the pressure plate 112 applies force from the spring or tensioner 114 ensuring the ball bearings 110 are held firmly in place and the carriage chassis 16 is secured in either the stowed or in-use position.

The pressure plate 112 includes a locking pin receiving hole 136 in which a locking pin 138 locates. The locking pin 138 extends through the outer casing 104 through a locking pin slot 140 and ensures the pressure plate 112 does not rotate relative to the outer casing 104. Securing the pressure plate 112 to the outer casing 104 allows the bearing keyway 108 to rotate when a force greater than a predetermined force is applied to the carriage chassis 16.

The bearing recesses 129 in the bearing keyway 108 are shaped such that the outer face of the walls surrounding the ball bearings 110 are removed. Removal of this outer face allows the ball bearings 110 to be positioned away from the central axis as much as possible and run on the inside of the outer casing 104. The pressure plate ball bearing receiving holes 134 are correspondingly placed away from the central axis to align with the ball bearings 110. The further the ball bearings 110 and ball bearing receiving holes 134 are positioned away from the central axis the more force is required to overcome the pressure plate 112 and spring or tensioner 114.

Figure 36:
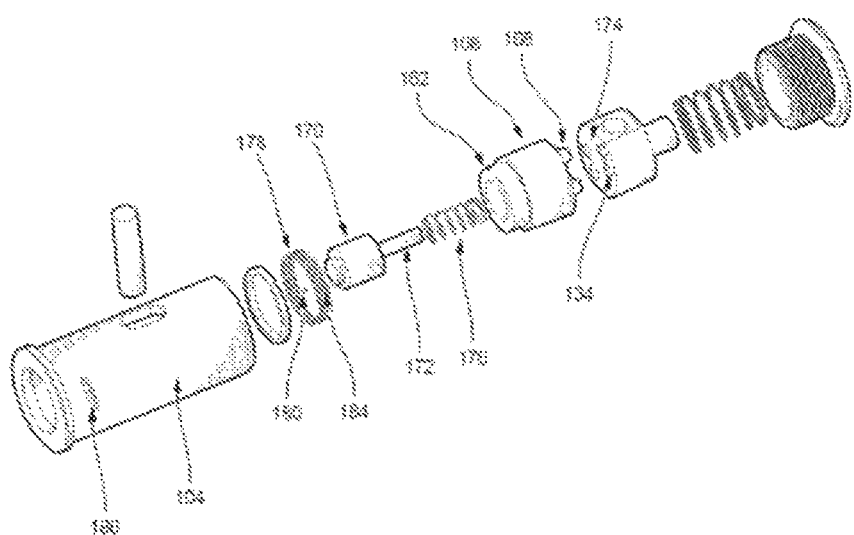
FIG. 36 is a schematic exploded perspective view of an indexed pivot hinge assembly according to one embodiment of the invention.
Figure 37:
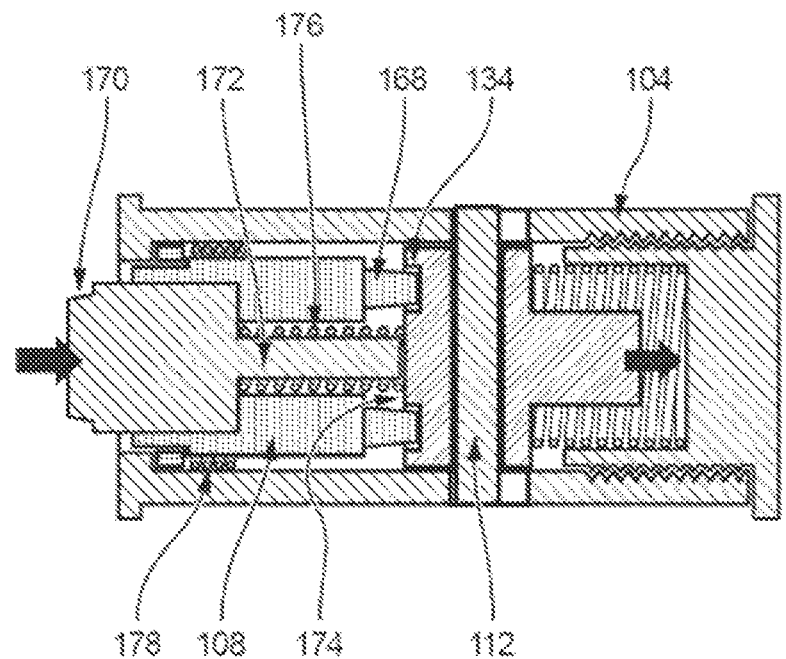
FIG. 37 is a schematic sectional side view of an indexed pivot hinge assembly according to one embodiment of the invention cut along its central axis.

In an alternative embodiment shown in FIGS. 36 and 37, the ball bearings 110 are replaced by bearing shafts 168 in the bearing keyway 108. The bearing shafts 168 locate into the pressure plate ball bearing receiving holes 134. A release push button 170 includes an actuation shaft 172 which passes through the bearing keyway 108 and stops short of the pressure plate front surface 174. An actuation shaft spring 176 is located behind the release push button 170 forcing the release push button 170 and associated actuation shaft 172 away from the pressure plate front surface 174 at all times. When the release push button 170 is depressed by a user, the actuation shaft spring 176 is overcome and the actuation shaft 172 pushes against the pressure plate 112 such that the bearing shafts 168 are no longer located in the pressure plate ball bearing receiving holes 134. With the bearing shafts 168 no longer engaged in the pressure plate ball bearing receiving holes 134, the carriage chassis 16 (not shown) is then free to rotate in relation to the bracket chassis 18 (not shown) allowing the user to move the ENVG 8 (not shown) between the in-use and stowed positions as required.

The indexed pivot hinge assembly 102 includes a torsional spring 178 positioned around the bearing keyway 108 and inside the outer casing 104. The torsional spring short end 180 locates in a bearing keyway spring slot 182. The torsional spring long end 184 locates in an outer casing slot 186. The torsional spring 178 is positioned such that the bearing keyway 108 is tensioned to return towards the stowed position. When a user depresses the release push button 170 and releases the bearing shafts 168 from the pressure plate ball bearing receiving holes 134, the torsional spring 178 rotates the bearing keyway 108 toward the stowed position. The user can then release the release push button 170 and continue moving the carriage chassis 16 (not shown) and attached ENVG 8 (not shown) to the stowed position until the bearing shafts 168 are located in the pressure plate ball bearing receiving holes 134 that align with the stowed position. The initial movement of the bearing keyway 108 provided by the torsional spring 178 when the release push button 170 is depressed, allows movement from the in-use position to the stowed position as a result of a single handed operation.

Figure 38:
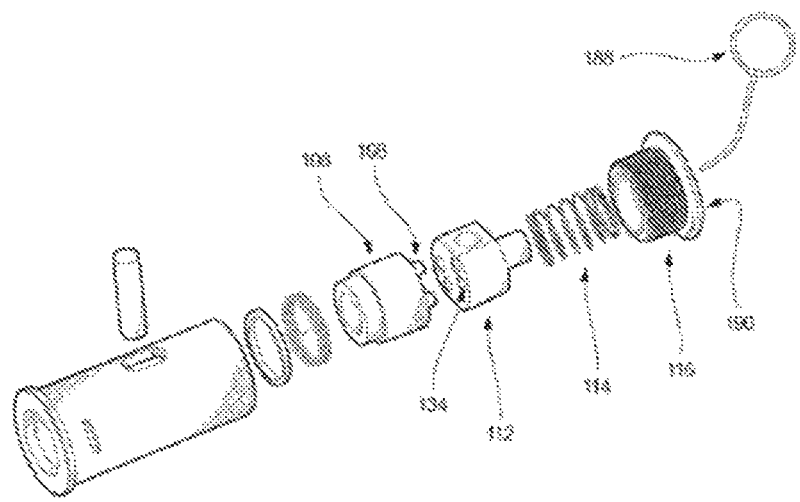
FIG. 38 is a schematic exploded perspective view of an indexed pivot hinge assembly according to one embodiment of the invention.
Figure 39:
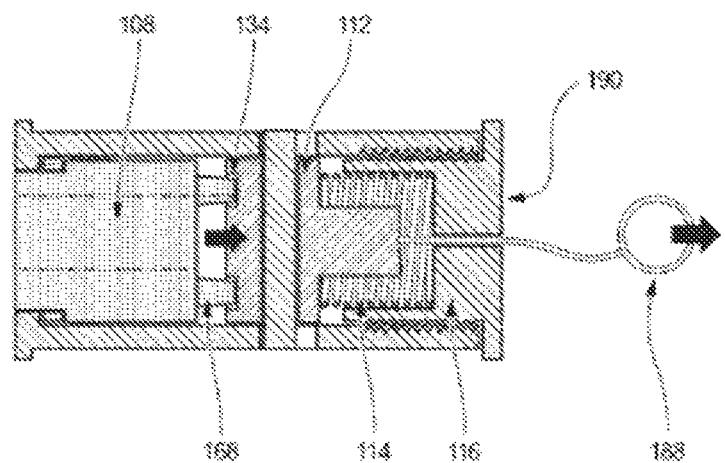
FIG. 39 is a schematic sectional side view of an indexed pivot hinge assembly according to one embodiment of the invention cut along its central axis.

In a further alternative embodiment shown in FIGS. 38 and 39, a cable or pull shaft 188 is attached to the pressure plate 112. The cable or pull shaft 188 passes through the spring or tensioner 114 and exits the casing cap 116. The cable or pull shaft 188 can be positioned on the casing cap external face 190 or can be routed to the side or back of the helmet 4 (not shown). When a user pulls on the cable or pull shaft 188, the pressure plate 112 is moved towards the casing cap 116 which compresses the spring or tensioner 114 and disengages the bearing shafts 168 from the pressure plate ball bearing receiving holes 134 allowing the bearing keyway 108 to rotate between the in-use and stowed positions.

In a further alternative embodiment shown in FIGS. 43, 44, 45 and 46, the outer casing 104 connects to the carriage chassis 16 through the carriage chassis hinge locator recess 106 and to the bracket member 18 through a bracket member hinge locator recess 200.

The indexed pivot hinge 102 includes an outer casing 104, inner casing 192, ball bearings 110 and a spring or tensioner 114. The outer casing 104 pivots around the inner casing 192, allowing the ENVG 8 to be moved between in-use and stowed positions.

The inner casing 104 comprises of an inner casing shaft 194, spring or tensioner receiving holes 132 and a index pin or stop 196. The index pin or stop could be conceived as a separate part, screwed or fixed to the inner casing shaft 194 or as past of the inner casing 192.

The outer casing 104 comprises of one or more sets of index ball bearing receiving holes 202 and an index pin slot 198. The index pin or stop 196 is received in the index pin slot 198 and restricts the rotation of the outer casing 104 to within the index pin slot limits.

Spring or tensioners 114 and ball bearings 110 are held within the spring or tensioner receiving holes 132 within the inner casing 192. The ball bearings 110 locate in the index ball bearing receiving holes 202 on the outer casing 104. The index ball bearing receiving holes 202 are located to position the carriage chassis 16 in either the in-use or stowed positions relative to the bracket member 18.

In use, rotation of the carriage chassis 16 with a force greater than a predetermined force, results in rotation of the ball bearings 110 against the outer casing 104 and compression against the spring or tensioner 114. Once the ball bearings 110 have rotated out of the index ball bearing receiving holes 202, the outer casing 104 is free to rotate around the inner casing 192 until the ball bearings 110 locate again in the index ball bearing receiving holes 202, which correspond with the either the stowed or in-use positions. As the ball bearings 110 locate into the index ball bearing receiving holes 202, the spring or tensioner 114 applies force to the ball bearings 110 ensuring the ball bearings 110 are held firmly in place within the index ball bearing receiving holes 202 and the carriage chassis 16 is secured in either the stowed or in-use position.

Side Dovetail Lock

Figure 40:
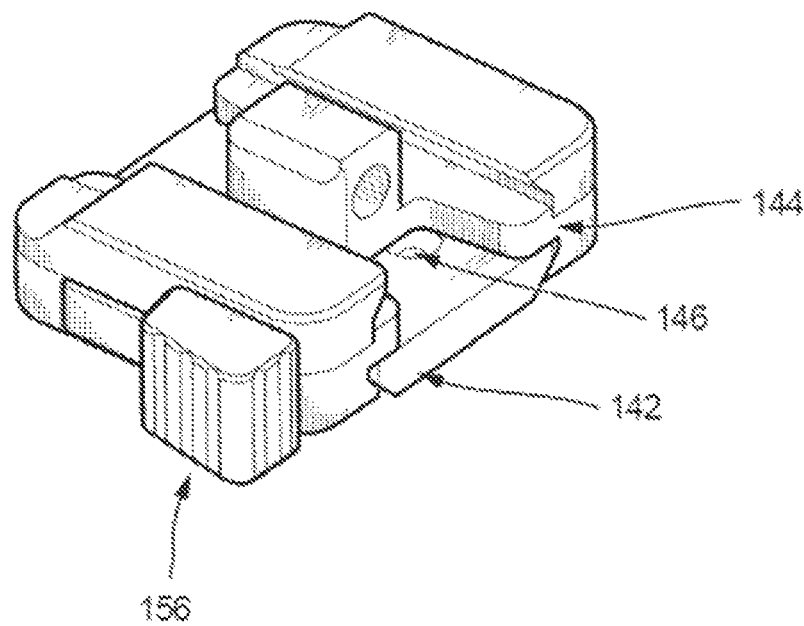
FIG. 40 is a perspective schematic view of a carriage chassis according to one embodiment of the invention.
Figure 41:
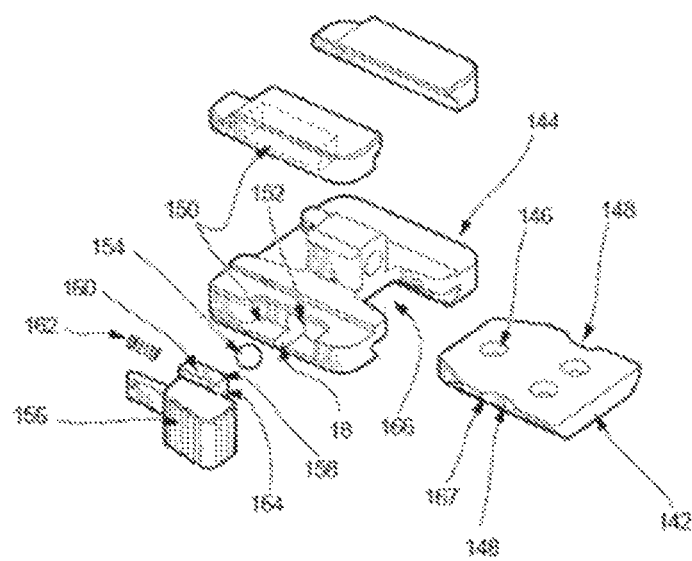
FIG. 41 is schematic exploded perspective view of a carriage chassis according to one embodiment of the invention.
Figure 42:
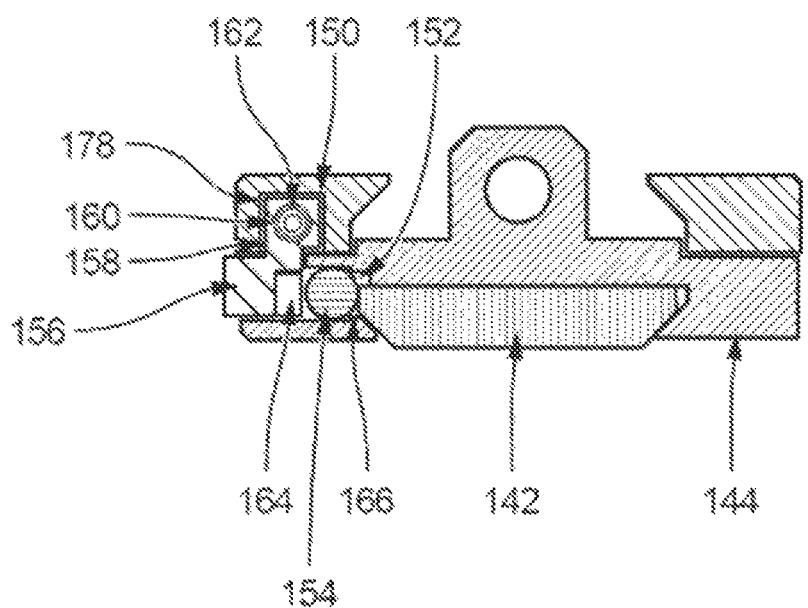
FIG. 42 is a schematic sectional side view of a carriage chassis according to one embodiment of the invention cut along its central axis.
Figure 43:
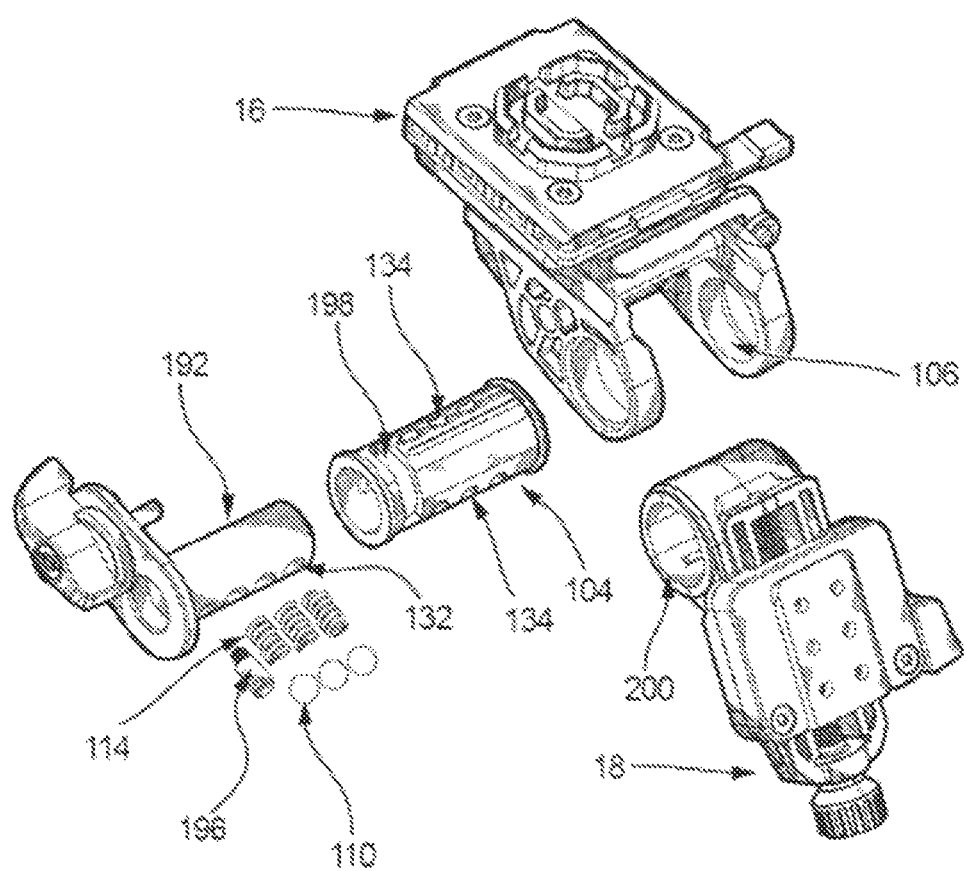
FIG. 43 is a schematic exploded perspective view of a hinged pivot assembly according to one embodiment of the invention.
Figure 44:
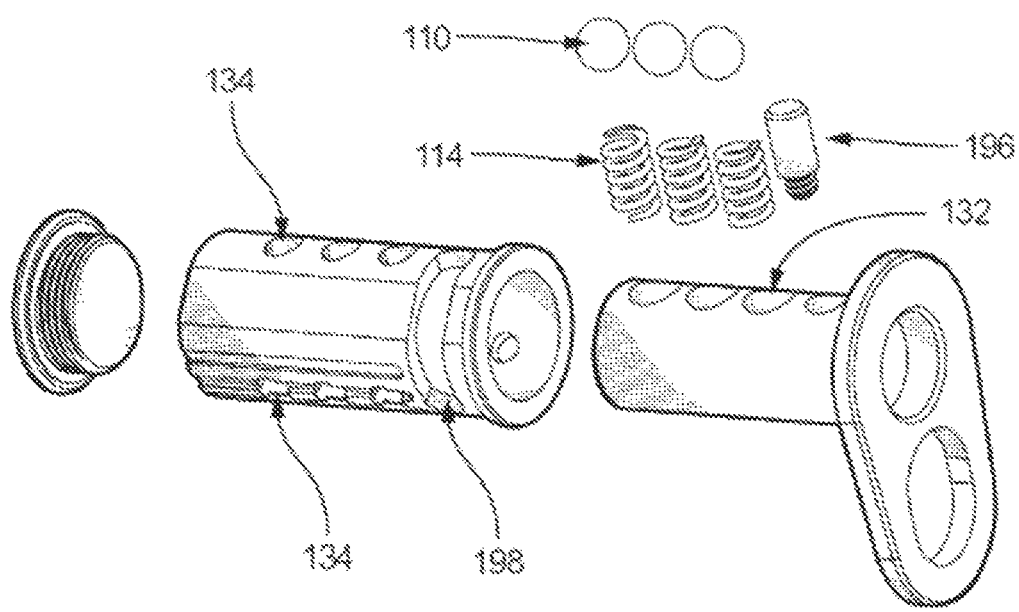
FIG. 44 is a schematic exploded perspective view of an indexed pivot hinge assembly according to an alternative embodiment of the invention.
Figure 45:
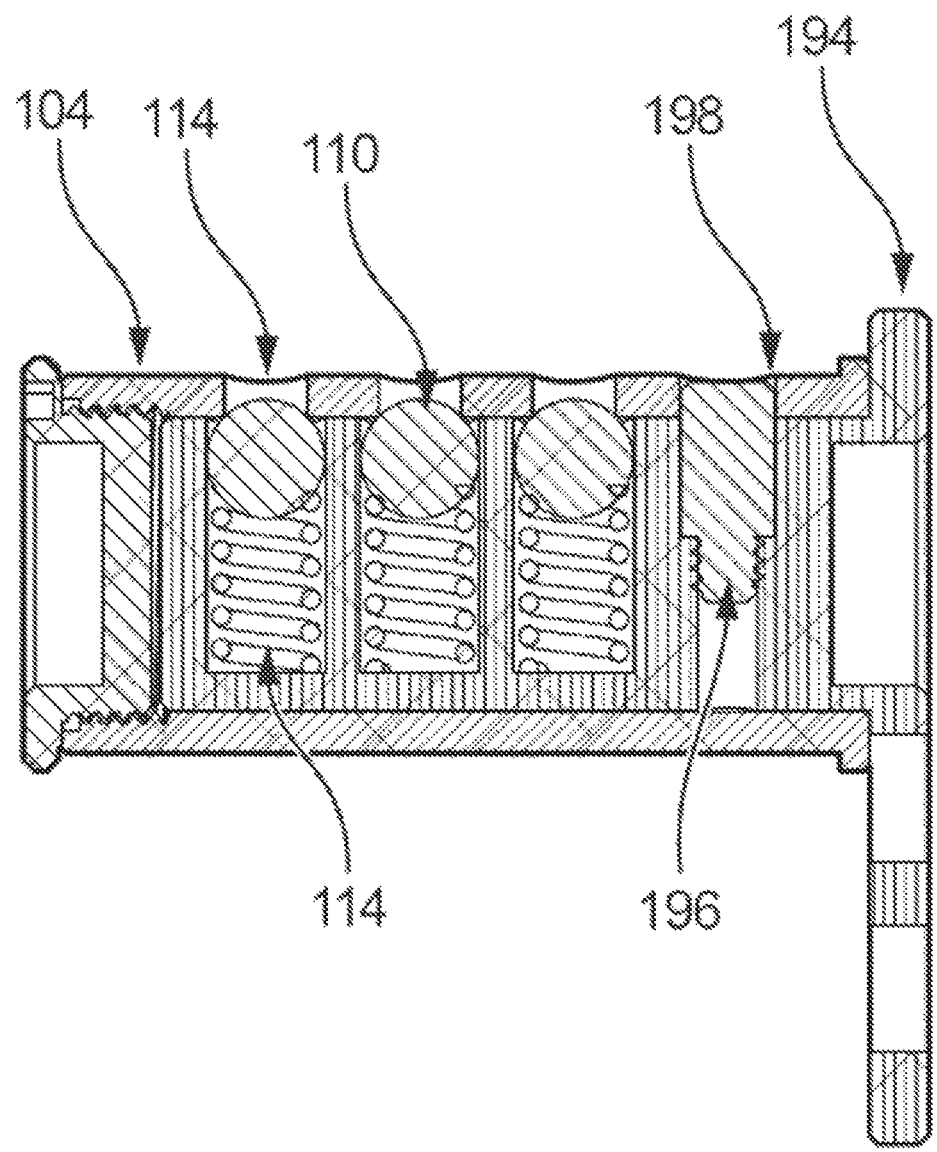
FIG. 45 is a schematic sectional side view of an indexed pivot hinge assembly according to one embodiment of the invention cut along its central axis.
Figure 46:
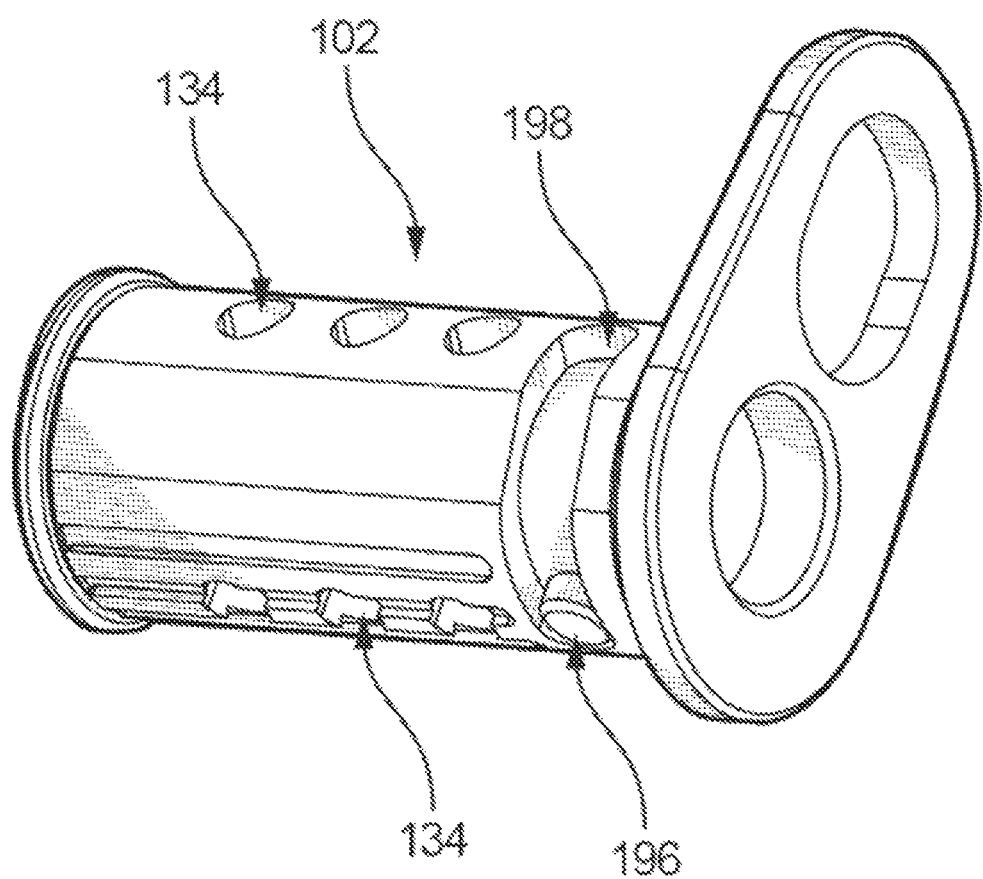
FIG. 46 is a perspective schematic view of an indexed pivot hinge assembly according to one embodiment of the invention.

Turning now to FIGS. 40, 41 and 42, there is shown an embodiment wherein the carriage chassis 16 includes a notched slidable dovetail clip 142 that is received in the carriage dovetail receiver 144. The ENVG 8 are secured to the notched slidable dovetail clip 142 through locating holes 146. The notched slidable dovetail clip 142 includes cut-out recesses 148 on the sides of the notched slidable dovetail clip 142.

The carriage dovetail receiver 144 includes a release recess 150 and hole cut-out 152 in which a locking ball 154 is located. The carriage chassis 16 also includes a slide carriage release lever 156 which sits into a release recess 150. The locking ball 154 is held captive at one end of the hole cut-out 152 by the slide carriage release lever 156. At the opposing end, the release recess 150 is shaped such that the locking ball 154 is captive and cannot escape but is free to move within the release recess 150.

The slide carriage release lever 156 includes a slide block 158 which fits in the base of the release recess 150. The release recess 150 is sized such that the slide block 158 is able to move front to back with respect to the user. The slide block 158 includes a spring recess 160 in which a slide compression spring 162 is located. The slide compression spring 162 pushes up against one end of the release recess 150 and forces the slide carriage release lever 156 away from the user. The slide block 158 includes an angled sliding plate 164, which rests up against the locking ball 154. The angled sliding plate 164 is shaped such that when the slide carriage release lever 156 is at rest and positioned away from the user, the locking ball 154 is pressed firmly into the hole cut-out 152. The locking ball 154 protrudes into the carriage dovetail receiver void 166 where the notched slidable dovetail clip 142 locates. When the notched slidable dovetail clip 142 is inserted into the carriage dovetail receiver void 166, the locking ball 154 interferes with the notched slidable dovetail clip 142, preventing the notched slidable dovetail clip 142 from being inserted.

The angled sliding plate 164 is shaped such that when the slide carriage release lever 156 is depressed and positioned towards the user, the locking ball 154 is able to move within the hole cut-out 152 away from the central axis. When the notched slidable dovetail clip 142 is inserted into the carriage dovetail receiver void 166, the locking ball 154 can be pushed back into the hole cut-out 152 and the notched slidable dovetail clip 142 can be fully located into the carriage dovetail receiver void 166.

When the notched slidable dovetail clip 142 is fully inserted into the carriage dovetail receiver void 166, the cut-out recesses 148 align with the hole cut-out 152. As the slide carriage release lever 156 is released, the slide compression spring 162 forces the slide block 158 away from the user. The angled sliding plate 164 is shaped such that as the slide carriage release lever 156 is moved away from the user, the locking ball 154 is pushed further into the hole cut-out 152 towards the centre of the mount until it protrudes into the carriage dovetail receiver void 166 and cut-out recesses 148 of the notched slideable dovetail clip 142.

The cut-out recesses 148 include a tapered face 167 at either end, such that as the angled sliding plate 164 presses against the locking ball 154 which in turn presses against the cut-out recess tapered face 167, the notched slidable dovetail clip 142 is forced further into the carriage dovetail receiver void 166. Forcing the notched slidable dovetail clip 142 further into the carriage dovetail receiver void 166 removes any slack or play that may occur between parts and ensures the attached ENVG 8 are held as firmly as possible.

While various embodiments of this invention have been shown and described, it would be apparent to those skilled in the art that many more modifications are possible without departing from the inventive concept herein. For example, although the clip block assemblies have been illustrated with three springs supporting each clip block, it should be realized that the number or shape of these springs could easily be changed to effect the spring tension. The style of locking mechanism could also be easily changed to a rotating latch or various other mechanisms that attach the bracket member to the helmet block assembly. It is, therefore, to be understood that within the scope of the appended claims, this invention may be practiced otherwise than as specifically described.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A flip-up helmet mount for an optical device comprising:
   (i) a helmet block adapted to secure the flip-up helmet mount to a helmet;
   (ii) a bracket member coupled to the helmet block, wherein the bracket member comprises at least one spring device, wherein the at least one spring device provides for the bracket member to couple to the helmet block via spring force, wherein the at least one spring device can be tensioned to change the spring force coupling the bracket member and the helmet block, and wherein tensioning of the at least one spring device adjusts the force required to uncouple the bracket member and the helmet block, thereby providing a calibrated multi-directional breakaway system;
   (iii) a carriage chassis coupled to the bracket member, wherein the carriage chassis is adapted to receive an optical device and comprises an automatic shutoff mechanism; and
   (iv) a hinged pivot assembly associated with the carriage chassis,
   wherein the bracket member provides for rotational coupling between the carriage chassis and the helmet block, and wherein the hinged pivot assembly enables the optical device to be moved from a stowed position to an in-use position without interocular adjustment.

2. The flip-up helmet mount of claim 1, wherein the at least one spring device engages with a coupling feature on the helmet block.

3. The flip-up helmet mount of claim 1, further comprising a locking mechanism to secure the bracket member to the helmet block.

4. The flip-up helmet mount of claim 3, wherein the locking mechanism overrides the spring force tension of the at least one spring device, thereby preventing separation of the bracket member and the helmet block and overriding the multi-directional breakaway system.

5. The flip-up helmet mount of claim 1, wherein the optical device is selected from the group consisting of a night vision goggle (NVG), an enhanced night vision goggle (ENVG), an opto-electronic device, a sighting device, a targeting device, a thermal imaging device, an infrared imaging device, a short-wave infrared imaging device, and a helmet-mounted display screen.

6. A flip-up helmet mount for an optical device comprising:
   (i) a helmet block adapted to secure the flip-up helmet mount to a helmet;
   (ii) a bracket member coupled to the helmet block by a calibrated multi-directional breakaway means;
   (iii) a carriage chassis coupled to the bracket member, wherein the carriage chassis is adapted to receive an optical device and comprises an automatic shutoff mechanism; and
   (iv) a hinged pivot assembly associated with the carriage chassis,
   wherein the bracket member provides for rotational coupling between the carriage chassis and the helmet block, and wherein the hinged pivot assembly enables the optical device to be moved from a stowed position to an in-use position without interocular adjustment.

7. A flip-up helmet mount for an optical device comprising:
   (i) a helmet block adapted to secure the flip-up helmet mount to a helmet;
   (ii) a bracket member coupled to the helmet block by a calibrated multi-directional breakaway means; and
   (iii) a carriage chassis coupled to the bracket member through a hinged pivot assembly,
   wherein the hinged pivot assembly is an indexed hinged pivot assembly that provides for rotational coupling between the carriage chassis and the helmet block, the carriage chassis is adapted to receive an optical device by a dovetail coupling, and wherein the indexed hinged pivot assembly enables the optical device to be moved from a stowed position to an in-use position without interocular adjustment.

8. The flip-up helmet mount of claim 6, wherein the calibrated multi-directional breakaway means comprises at least one spring device, and wherein the at least one spring device provides for the helmet block to couple to the bracket member via spring force.

9. The flip-up helmet mount of claim 8, wherein the at least one spring device is associated with the helmet block and engages with a coupling feature on the bracket member.

10. The flip-up helmet mount of claim 8, wherein the at least one spring device is associated with the bracket member and engages with a coupling feature on the helmet block.

11. The flip-up helmet mount of claim 8, wherein the at least one spring device can be tensioned to change the spring force coupling the bracket member and the helmet block.

12. The flip-up helmet mount of claim 11, wherein tensioning of the at least one spring device adjusts the force required to uncouple the bracket member and the helmet block.

13. The flip-up helmet mount of claim 6, further comprising a locking mechanism to secure the bracket member to the helmet block.

14. The flip-up helmet mount of claim 13, wherein the locking mechanism overrides the spring force tension of the at least one spring device, thereby preventing separation of the bracket member and overriding the multi-directional breakaway system.

15. The flip-up helmet mount of claim 7, wherein the optical device is selected from the group consisting of a night vision goggle (NVG), an enhanced night vision goggle (ENVG), an opto-electronic device, a sighting device, a targeting device, a thermal imaging device, an infrared imaging device, a short-wave infrared imaging device, and a helmet-mounted display screen.

16. The flip-up helmet mount of claim 1, wherein the hinged pivot assembly comprises an adjustment bar that passes through the hinged pivot assembly.

17. The flip-up helmet mount of claim 16, wherein the adjustment bar protrudes beyond the hinged pivot assembly and is stopped against the carriage chassis when the optical device is in the in-use position.

18. The flip-up helmet mount of claim 17, wherein the adjustment bar comprises a screw and the hinged pivot assembly comprises a receiving thread for the screw.

19. The flip-up helmet mount of claim 1, wherein the carriage chassis is adapted to receive an optical device via a dovetail coupling.

20. The flip-up helmet mount of claim 19, wherein the dovetail coupling comprises a fixed dovetail ledge on the carriage chassis and an associated slidable dovetail clip.

21. The flip-up helmet mount of claim 19, wherein the dovetail coupling comprises a notched slidable dovetail clip and the carriage chassis has a receiving slot with at least one ball bearing, such that in use, the at least one ball bearing is positioned in a notch of the slidable dovetail clip, thus securing the dovetail clip in the receiving slot of the carriage chassis.

* * * * *